United States Patent
Yamashita et al.

(10) Patent No.: US 10,603,582 B2
(45) Date of Patent: Mar. 31, 2020

(54) VIBRATION CONTROL SYSTEM, VIBRATION CONTROL APPARATUS, STORAGE MEDIUM AND VIBRATION CONTROL METHOD

(71) Applicant: NINTENDO CO., LTD., Kyoto (JP)

(72) Inventors: Kei Yamashita, Kyoto (JP); Takafumi Aoki, Kyoto (JP); Yoshitaka Tamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/854,107

(22) Filed: Dec. 26, 2017

(65) Prior Publication Data

US 2018/0178121 A1    Jun. 28, 2018

(30) Foreign Application Priority Data

Dec. 27, 2016   (JP) .................. 2016-252315

(51) Int. Cl.

| A63F 9/24 | (2006.01) |
|---|---|
| A63F 13/00 | (2014.01) |
| G06F 17/00 | (2019.01) |
| G06F 19/00 | (2018.01) |
| A63F 13/285 | (2014.01) |
| A63F 13/235 | (2014.01) |

(Continued)

(52) U.S. Cl.
CPC .......... *A63F 13/285* (2014.09); *A63F 13/23* (2014.09); *A63F 13/235* (2014.09); *A63F 13/24* (2014.09); *A63F 13/843* (2014.09); *A63F 13/92* (2014.09); *G06F 3/016* (2013.01)

(58) Field of Classification Search
CPC .......................... A63F 13/285; A63F 13/216
See application file for complete search history.

(56) References Cited

U.S. PATENT DOCUMENTS

| 4,501,424 A | 2/1985 | Stone et al. |
| 5,016,843 A | 5/1991 | Ward |

(Continued)

FOREIGN PATENT DOCUMENTS

| EP | 3 103 532 | 3/2017 |
| GB | 2393316 A | 3/2004 |

(Continued)

*Primary Examiner* — Milap Shah
*Assistant Examiner* — Jason Pinheiro
(74) *Attorney, Agent, or Firm* — Nixon & Vanderhye PC

(57) ABSTRACT

A non-limiting example game apparatus includes a main body apparatus that functions as a vibration control apparatus and a first controller and a second controller attachable to or detachable from the main body apparatus. For example, the game apparatus can be used in one of a first mode that two controllers are attached to the main body apparatus, a second mode that the two controllers are individually used in a separated state from the main body apparatus, a third mode that the two controllers are used in a state where the two controllers are detached from the main body apparatus and connected integrally to each other, and a fourth mode that a third controller that is different from the two controllers is used. For example, the same type of vibration motor is used for each controller, and a CPU incorporated in the main body apparatus controls a vibration waveform according to the usage mode of the game apparatus.

20 Claims, 17 Drawing Sheets

(51) Int. Cl.
*A63F 13/24* (2014.01)
*A63F 13/92* (2014.01)
*G06F 3/01* (2006.01)
*A63F 13/23* (2014.01)
*A63F 13/843* (2014.01)

(56) References Cited

U.S. PATENT DOCUMENTS

| | | | |
|---|---|---|---|
| 5,421,590 | A | 6/1995 | Robbins |
| 5,667,220 | A | 9/1997 | Cheng |
| 5,739,457 | A | 4/1998 | Devecka |
| 5,929,809 | A | 7/1999 | Erlick et al. |
| 5,929,844 | A | 7/1999 | Barnes |
| 6,478,679 | B1 | 11/2002 | Himoto et al. |
| 6,540,614 | B1 | 4/2003 | Nishino et al. |
| 6,645,067 | B1 | 11/2003 | Okita et al. |
| 6,714,189 | B2 | 3/2004 | Collins |
| 6,952,197 | B1 | 10/2005 | Nakamura et al. |
| 7,379,841 | B2 | 5/2008 | Ohta |
| 7,405,353 | B2 | 7/2008 | Kiyono et al. |
| 7,479,064 | B2 | 1/2009 | Wakitani et al. |
| 7,698,096 | B2 | 4/2010 | Ohta |
| 7,711,505 | B2 | 5/2010 | Ohta |
| 8,308,563 | B2 | 11/2012 | Ikeda et al. |
| 8,439,753 | B2 | 5/2013 | Wakitani et al. |
| 8,900,058 | B2 | 12/2014 | Wakitani et al. |
| 2001/0012795 | A1 | 8/2001 | Asami et al. |
| 2001/0012802 | A1* | 8/2001 | Nishiumi ............ A63F 13/02 463/37 |
| 2001/0016518 | A1* | 8/2001 | Nishiumi ............ A63F 13/06 463/36 |
| 2003/0114214 | A1 | 6/2003 | Barahona et al. |
| 2005/0056997 | A1 | 3/2005 | Wakitani et al. |
| 2008/0242412 | A1 | 10/2008 | Wakitani et al. |
| 2010/0099494 | A1 | 4/2010 | Dohta |
| 2011/0306424 | A1 | 12/2011 | Kazama et al. |
| 2012/0232780 | A1 | 9/2012 | Delson et al. |
| 2012/0302347 | A1 | 11/2012 | Nicholson |
| 2013/0281212 | A1 | 10/2013 | Tsuchiya et al. |
| 2015/0084900 | A1 | 3/2015 | Hodges et al. |
| 2015/0153830 | A1* | 6/2015 | Hirose ............... G06F 3/0488 345/173 |
| 2015/0268722 | A1* | 9/2015 | Wang .................. G06F 3/016 345/156 |
| 2016/0361627 | A1 | 12/2016 | Fujita et al. |
| 2016/0361633 | A1 | 12/2016 | Fujita et al. |
| 2017/0106275 | A1 | 4/2017 | Tsuchiya et al. |
| 2017/0372534 | A1 | 12/2017 | Steketee |

FOREIGN PATENT DOCUMENTS

| | | |
|---|---|---|
| JP | 04-225413 | 8/1992 |
| JP | 11-232028 | 8/1999 |
| JP | 2000-148136 | 5/2000 |
| JP | 2000-157736 | 6/2000 |
| JP | 2000-172377 | 6/2000 |
| JP | 2000-176176 | 6/2000 |
| JP | 2001-067070 | 3/2001 |
| JP | 2001-069427 | 3/2001 |
| JP | 2001-170352 | 6/2001 |
| JP | 3080103 | 6/2001 |
| JP | 2001-276421 | 10/2001 |
| JP | 2001-321564 | 11/2001 |
| JP | 2001-325055 | 11/2001 |
| JP | 2001-327754 | 11/2001 |
| JP | 2002-011243 | 1/2002 |
| JP | 2002-078970 | 3/2002 |
| JP | 2002-123353 | 4/2002 |
| JP | 2002-202853 | 7/2002 |
| JP | 2002-218558 | 8/2002 |
| JP | 2002-239233 | 8/2002 |
| JP | 2002-248261 | 9/2002 |
| JP | 2002-351489 | 12/2002 |
| JP | 2003-154173 | 5/2003 |
| JP | 2008-307207 | 12/2008 |
| JP | 2008-546534 | 12/2008 |
| JP | 2012-000162 | 1/2012 |
| JP | 2013-236909 | 11/2013 |
| JP | 2017-000757 | 1/2017 |
| JP | 2017-000760 | 1/2017 |
| WO | 98/02223 | 1/1998 |
| WO | 99/19036 | 4/1999 |
| WO | 00/31605 | 6/2000 |

* cited by examiner

FIRST MODE

FIG. 9
FOURTH MODE
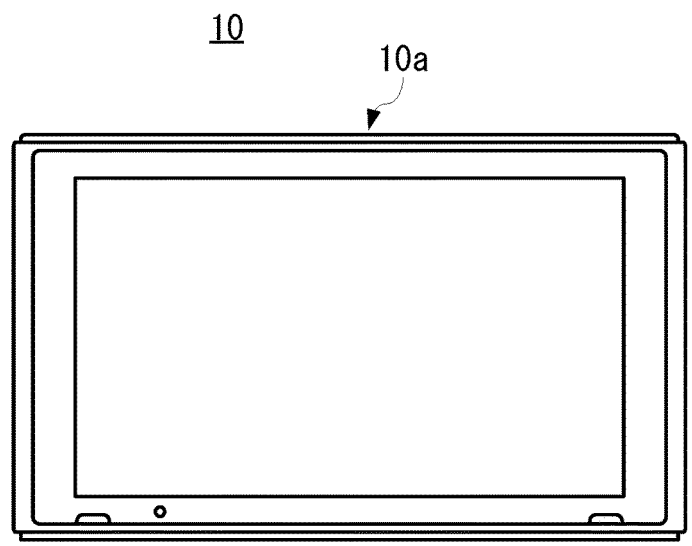
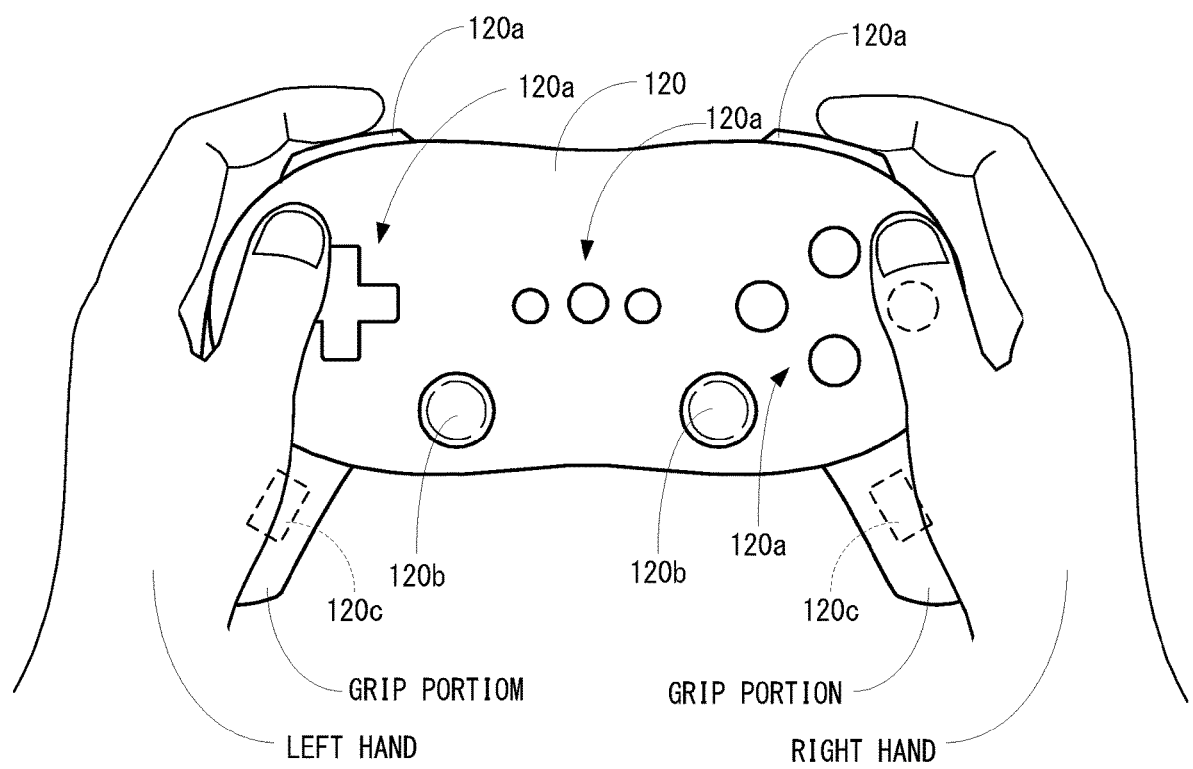

CASE OF FOURTH MODE (USING THIRD CONTROLLER)

| USAGE MODE | COEFFICIENT DATA |
|---|---|
| FIRST TO THIRD MODES | $(fa, \alpha 1), (fb, \alpha 2), \cdots, (fn, \alpha n)$ |
| FOURTH MODE | $(fa, \beta 1), (fb, \beta 2), \cdots, (fn, \beta n)$ |

# VIBRATION CONTROL SYSTEM, VIBRATION CONTROL APPARATUS, STORAGE MEDIUM AND VIBRATION CONTROL METHOD

CROSS REFERENCE OF RELATED APPLICATION

The disclosure of Japanese patent application No. 2016-252315 filed on Dec. 27, 2016 is incorporated by reference.

FIELD

This application describes a vibration control system, vibration control apparatus, storage medium and vibration control method, controlling vibration of a plurality of devices having different characteristics.

SUMMARY

It is a primary object of an embodiment(s) to provide a novel vibration control system, vibration control apparatus, storage medium and vibration control method.

Moreover, it is another object of the embodiment(s) to provide a vibration control system, vibration control apparatus, storage medium and vibration control method, capable of making vibration to be perceived similarly even for devices having different characteristics.

Furthermore, it is a further object of the embodiment(s) to provide a vibration control system, vibration control apparatus, storage medium and vibration control method, capable of reducing labor involved in developing an application.

A first embodiment is a vibration control system, comprising: a vibration data generation portion; and a vibration control portion. The vibration data generation portion is configured to generate vibration data. The vibration control portion is configured to make a first device vibrate based on the vibration data that is generated by the vibration data generation portion, and a second device vibrate while controlling a vibration waveform corresponding to the vibration data according to a characteristic of the second device different from a characteristic of the first device.

According to the first embodiment, since the vibration waveform in a case of vibrating the second device is controlled, it is possible to make the same or similar vibration to be perceived even if the characteristics of the first device and the second device are different from each other, without making a developer of an application consider a vibration expression according to the characteristic of the device. Therefore, it is possible to reduce labor involved in developing an application.

A second embodiment is the vibration system according to the first embodiment, wherein the vibration data that is generated by the vibration data generation portion is data of values respectively indicating a frequency and an amplitude of the vibration waveform corresponding to the vibration data.

According to the second embodiment, it is possible to make the first device and the second device vibrate by designating the frequency and the amplitude of the vibration waveform.

A third embodiment is the vibration system according to the second embodiment, wherein the vibration control portion is configured to control the amplitude of the vibration waveform for each frequency band.

According to the third embodiment, since the amplitude is controlled for each frequency band, it is possible to control the waveform more easily than controlling all of the vibration waveform.

A fourth embodiment is the vibration system according to the third embodiment, wherein the vibration data is data for a set of values of the frequency and the amplitude of the vibration waveform, and the vibration control portion is configured to control the vibration waveform by multiplying, for each frequency band, the amplitude of each set by a coefficient.

According to the fourth embodiment, since the amplitude among the frequency and the amplitude of the vibration waveform is controlled, even if either the first device or the second device is used, it is possible to make the same or similar vibration to be perceived by controlling the amplitude.

A fifth embodiment is the vibration system according to the first embodiment, wherein the vibration control portion is configured to make the first device and the second device vibrate simultaneously.

According to the fifth embodiment, even if either the first device or the second device is used, the same or similar vibration can be made be perceived.

A sixth embodiment is the vibration system according to the first embodiment, wherein the vibration data generation portion is included in a main body apparatus that is separated from the first device and the second device.

According to the sixth embodiment, since the vibration data is generated in the main body apparatus, the first device and the second device may be attached to the main body apparatus or may be separated from the main body apparatus.

A seventh embodiment is the vibration system according to the sixth embodiment, wherein the main body apparatus is connected with at least one of the first device and the second device. The vibration control portion is configured to control the vibration waveform of the at least corresponding one of the first device and the second device based on type information that is acquired from the at least one of the first device and the second device being connected to the main body apparatus.

According to the seventh embodiment, it is possible to make at least one of the first device and the second device vibrate in accordance with a connection manner of the first device and the second device.

An eighth embodiment is the vibration system according to the sixth embodiment, wherein the main body apparatus comprises an application execution portion configured to execute an application program. The vibration control portion is configured to control the vibration waveform of the first device or the second device in accordance with a connection manner of the first device or the second device notified from the application program executed by the application execution portion.

According to the eighth embodiment, it is possible to make the first device or the second device by acquiring the connection manner of the first device or the second device from the application program.

A ninth embodiment is a vibration control apparatus, comprising: a vibration data generation portion configured to generate vibration data; and a vibration control portion configured to make a first device vibrate based on the vibration data that is generated by the vibration data generation portion, and a second device vibrate while controlling vibration waveform corresponding to the vibration data according to a characteristic of the second device different from a characteristic of the first device.

A tenth embodiment is a non-transitory computer readable storage medium storing a vibration control program that is executable by a computer, wherein the vibration control program causes one or more processors of the computer to perform steps of: a vibration data generation step that generates vibration data; and a vibration control step that makes a first device vibrate based on the vibration data that is generated by the vibration data generation step, and a second device vibrate while controlling vibration waveform corresponding to the vibration data according to a characteristic of the second device different from a characteristic of the first device.

An eleventh embodiment is a vibration control method, comprising steps of: (a) a step generating vibration data; and (b) a step making a first device vibrate based on the vibration data that is generated the step (a), and a second device vibrate while controlling vibration waveform corresponding to the vibration data according to a characteristic of the second device different from a characteristic of the first device.

According to any one of the ninth to eleventh embodiments, it is also possible to make the same or similar vibration to be perceived even if the characteristics of the first device and the second device are different from each other, and to reduce labor involved in developing an application.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 9 is an illustration view showing the other non-limiting example usage mode of the game apparatus shown in FIG. 1.

DETAILED DESCRIPTION OF NON-LIMITING EXAMPLE EMBODIMENTS

Figure 1:
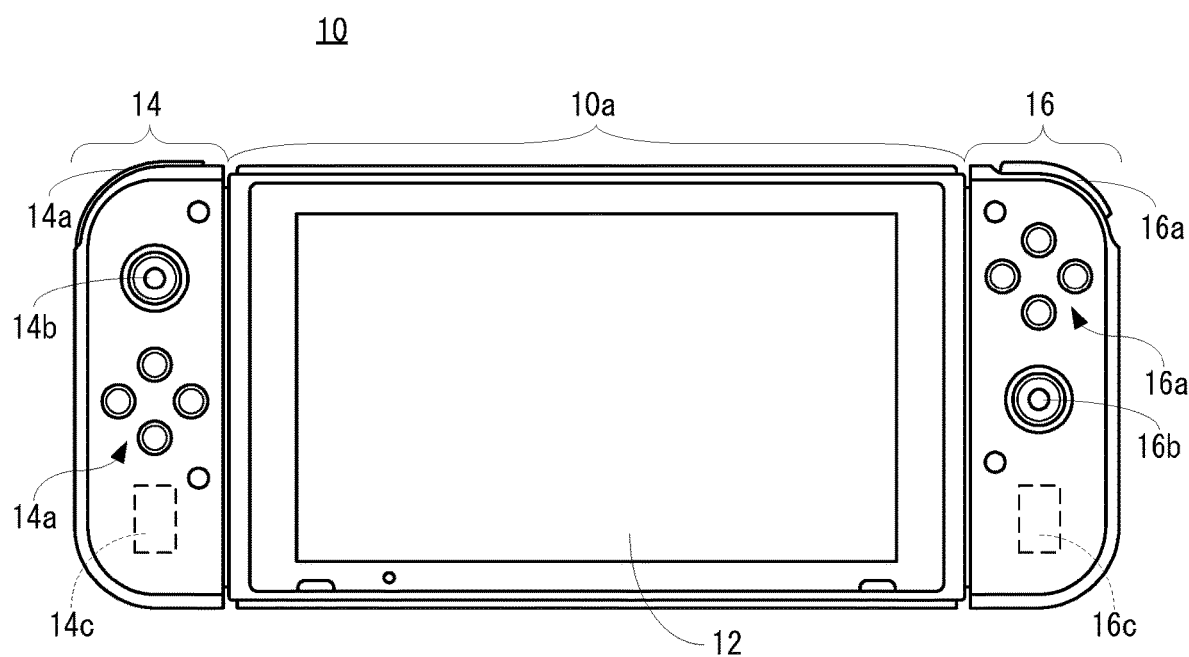
FIG. 1 is an illustration view showing a non-limiting example appearance configuration of a non-limiting example game apparatus.
Figure 2:
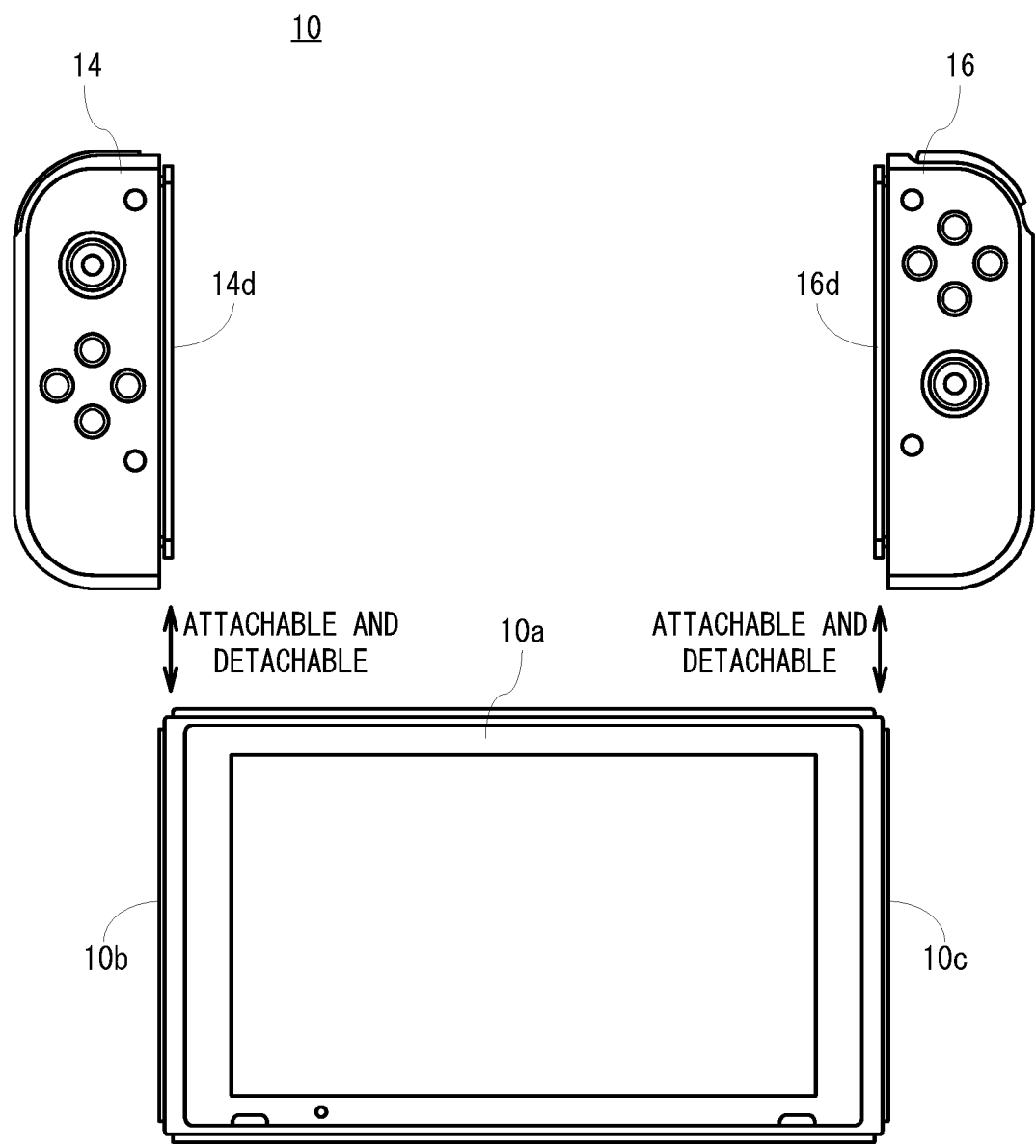
FIG. 2 is an illustration view showing a non-limiting example state where a controller is separated from a main body apparatus in the game apparatus shown in FIG. 1.

With reference to FIG. 1, a non-limiting example game apparatus 10 includes a main body apparatus 10a. The main body apparatus 10a also functions as a vibration control apparatus. A display 12 is provided on this main body apparatus 10a. The display 12 is an LCD, but may be a display using an organic EL. Moreover, the game apparatus 10 includes a first controller 14 and a second controller 16, and as shown in FIG. 2, the first controller (left controller) 14 is provided in a left side of the main body apparatus 10a in an attachable/detachable manner, and the second controller (right controller) 16 is provided in a right side of the main body apparatus 10a in an attachable/detachable manner.

In addition, although the game apparatus 10 is described as an example of an information processing apparatus in this embodiment, a smartphone, a tablet terminal, etc. can be used for the main body apparatus 10a. However, to use a smartphone or a tablet terminal, it is necessary to provide separately structure that the first controller 14 and the second controller 16 are attachable or detachable.

Although described later for details, the first controller 14 and the second controller 16 can be used in an attached state to the main body apparatus 10a, and also can be used in a detached (separated) state from the main body apparatus 10a. When the first controller 14 and the second controller 16 are separated from the main body apparatus 10a, a single player (or user) can use both the first controller 14 and the second controller 16.

In addition, in this embodiment, the first controller 14 and the second controller 16 are both attached to the main body apparatus 10a, or detached from the main body apparatus 10a.

The first controller 14 is provided with various kinds of operation buttons 14a and an analog stick 14b. Although a detailed description is omitted, the operation buttons 14a and the analog stick 14b can be any one of surface excluding a surface attached to the main body apparatus 10a among surfaces of a housing of the first controller 14. The operation buttons 14a are provided in order to perform instructions according to various kinds of programs executed by the main body apparatus 10a. The analog stick 14b can designate a direction by being tilted. However, a slide stick may be provided instead of the analog stick 14b. Moreover, the analog stick 14b may be configured to also function as an operation button by being depressed. Moreover, in the housing of the first controller 14, there is provided with a vibration motor (vibrator) 14c for presenting vibration to a player that holds the first controller 14 (including case of being attached to the main body apparatus 10a). These can be also applied to the second controller 16 described later.

Similar to the first controller 14, the second controller 16 is provided with various kinds of operation buttons 16a and an analog stick 16b. Furthermore, a vibration motor 16c is provided in a housing of the second controller 16.

Moreover, although illustration is omitted, a connector for connecting with a charge stand 50 and a sound emission hole for emitting a sound of a speaker 38 (see FIG. 3) are provided in a bottom surface of the main body apparatus 10a. However, the bottom surface of the main body apparatus 10a is a surface perpendicular to a display surface of the display 12, and is a surface located in a lower side in FIG. 1. For example, when a player uses the game apparatus 10 shown in FIG. 1, the above-described connector and the sound emission hole turn to a side of the player.

Furthermore, as shown in FIG. 2, a rail member 10b is provided in a left side surface of the main body apparatus 10a, and a rail member 10c is provided in a right side surface of the main body apparatus 10a. On the other hand, a slider 14d is provided in one side surface (right side surface in FIG. 2) of a longitudinal direction of the housing of the first controller 14, and a slider 16d is provided in one side surface (left side surface in FIG. 2) of a longitudinal direction of the housing of the second controller 16.

The rail member 10b is constituted so as to be engageable with the slider 14d, and the rail member 10c is constituted so as to be engageable with the slider 16d. That is, a slide mechanism is formed of the rail member 10b and the slider 14d, and a slide mechanism is formed of the rail member 10c and the slider 16d. Therefore, the first controller 14 and the second controller 16 are respectively slidable on the main body apparatus 10a, and provided in an attachable and detachable manner.

In addition, the rail members (10b, 10c) may be provided on the controllers (14, 16), and the sliders (14d, 16d) may be provided on the main body apparatus 10a. Moreover, as a mechanism for attaching/detaching the first controller 14 and the second controller 16 to or from the main body apparatus 10a, other mechanisms may be adopted. For example, as the other mechanisms, a convex portion (or concave portion) that fits to a concave portion (convex portion) provided on the main body apparatus 10a may be provided on each of the housings of the first controller 14 and the second controller 16.

Figure 3:
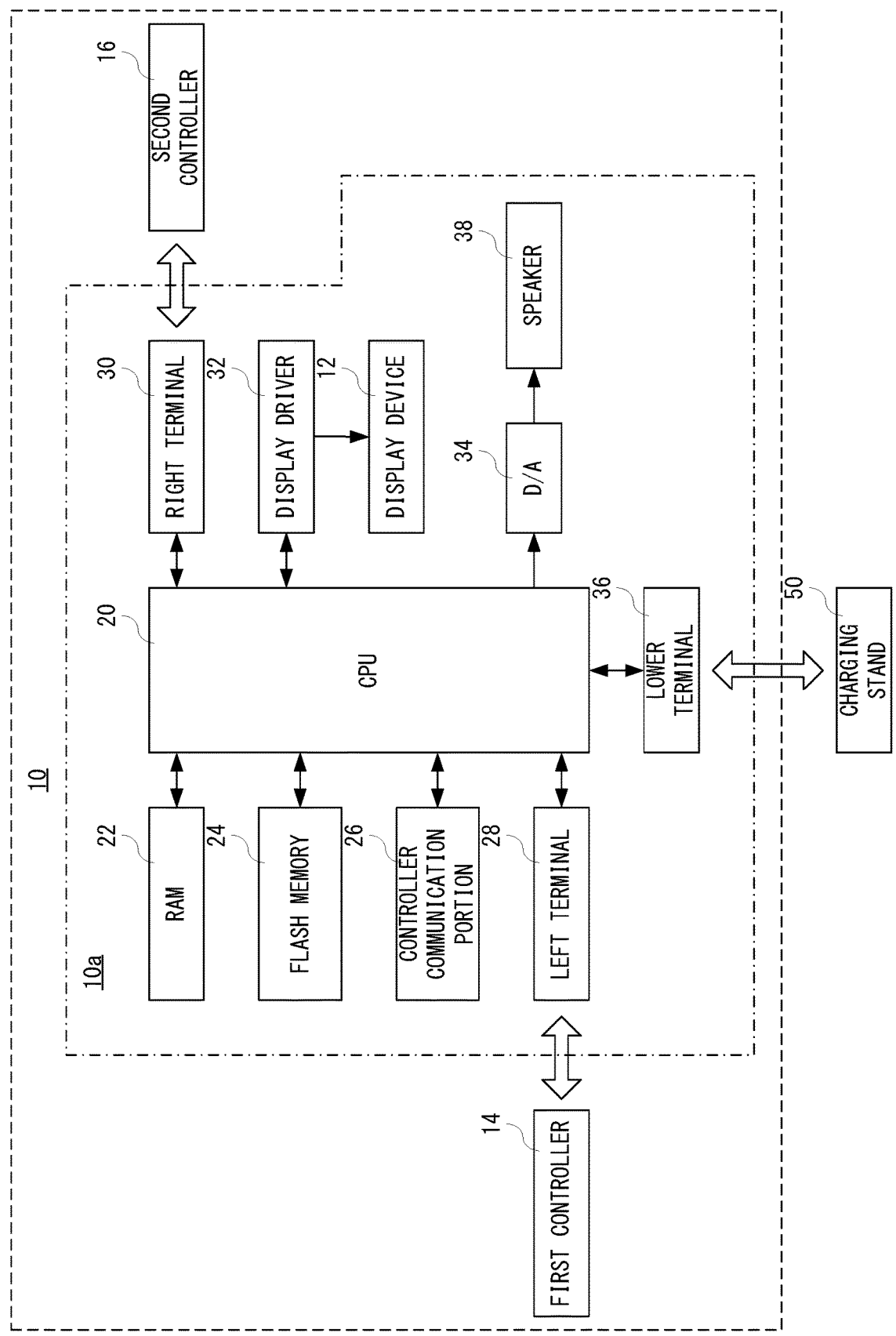
FIG. 3 is a block diagram showing a non-limiting example electric configuration of the game apparatus shown in FIG. 1 and FIG. 2.

FIG. 3 is a block diagram showing a non-limiting example electric configuration of the game apparatus 10 shown in FIG. 1 and FIG. 2. As shown in FIG. 3, the game apparatus 10 includes a CPU 20, and the CPU 20 is connected with a RAM 22, a flash memory 24, a controller communication portion 26, a left terminal 28, a right terminator 30, a display driver 32, a D/A (Digital to Analog) converter 34 and a lower terminal 36. Moreover, the display 12 is connected to the display driver 32, and the speaker 38 is connected to the D/A converter 34. These components are provided in an interior of the main body apparatus 10a. However, connection portions (connection terminals) of the left terminal 28, the right terminal 30 and the lower terminal 36 are provided so as to be exposed from the main body apparatus 10a.

As described above, the game apparatus 10 includes the first controller 14 and the second controller 16, and when these are attached to the main body apparatus 10a, the first controller 14 is electrically connected with the left terminal 28 and the second controller 16 is electrically connected to the right terminal 30.

Moreover, when the game apparatus 10 is put on the charge stand (cradle) 50, the bottom terminal 36 is connected with a connection plug (not shown) provided in the charge stand 50. In this case, an electric power is supplied to the game apparatus 10 through the bottom terminal 36 from the charge stand 50, whereby a battery built in the main body apparatus 10a can be charged, and batteries respectively built in the first controller 14 and the second controller 16 that are connected to the main body apparatus 10a can be charged.

However, as described later, the charge stand 50 can be connected to a television receiver 60 (see FIG. 14), and in this case, AV (audio and video (image)) data that is output via the bottom terminal 36 from the main body apparatus 10a is given to the television receiver 60 through the charge stand 50. Therefore, a game screen is displayed on a display (monitor) of the television receiver 60, and a voice or/and music are output from a speaker of the television receiver 60.

The CPU 20 is in charge of overall control of the game apparatus 10. The RAM 22 is a volatile storage device and is used as a working area and a buffer area of the CPU 20. The flash memory 24 is a nonvolatile storage device, and stores various programs (information processing programs) that are executable by the game apparatus 10, save data, etc.

In addition, the above-described information processing program is an application program for game as an example, but need not to be limited to this. The application program may be other programs such as a document production program, an email program, a painting program, a character or letter practice program, a linguistic training program, a learning program, etc.

In the following, a configuration that the main body apparatus 10a performs communication with the first controller 14 and the second controller 16 will be described.

In this embodiment, when the first controller 14 and the second controller 16 are in a state separated from the main body apparatus 10a, the main body apparatus 10a performs wireless communication with the first controller 14 and the second controller 16. On the other hand, when the first controller 14 and the second controller 16 are attached to the main body apparatus 10a, the main body apparatus 10a performs wire-communication with the first controller 14 and the second controller 16.

The controller communication portion 26 performs wireless communication with the first controller 14 and the second controller 16. Although it is possible to adopt an arbitrary communication system for a communication system between the main body apparatus 10a and each controller (14, 16), in this embodiment, a communication system according to the standard of Bluetooth (registered trademark) is adopted.

The left terminal 28 is a terminal for performing wire-communication between the CPU 20 and the first controller 14 when the first controller 14 is attached to the main body apparatus 10a, the CPU 20 transmits or receives data to or from the first controller 14 via the left terminal 28.

The right terminal 30 is a terminal for performing wire-communication between the CPU 20 and the second controller 16 when the second controller 16 is attached to the main body apparatus 10a, the CPU 20 transmits or receives data to or from the second controller 16 via the right terminal 30.

In this embodiment, the data to be transmitted from the CPU 20 to each controller (14, 16) is vibration data for making each controller (14, 16) vibrate. The vibration data is generated, by the CPU 20, by executing program that generates vibration data, by reading vibration data being stored, or the like. The vibration data is data that indicates a vibration waveform (waveform of an analog signal), and may be a signal of the vibration waveform itself (vibration signal), data that the vibration waveform is digitized, or data of a set of values respectively indicating a frequency and an amplitude. On the other hand, the data to be transmitted from each controller (14, 16) is operation data in a case where the operation buttons (14a, 16a) and the analog sticks (14b, 16b) respectively provided in the controllers (14, 16) are operated. However, other data such as various kinds of control signals etc. may be transmitted and received between the CPU 20 and the respective controllers (14, 16).

Thus, the main body apparatus 10a can perform wire-communication and wireless communication with the first controller 14 and the second controller 16, respectively.

In addition, although illustration is omitted, the left terminal 28 connects a power line for supplying a power source from the charge stand 50 to a charge circuit for the battery built in the first controller 14. This is true about the right terminal 30.

The display driver 32 includes a GPU and a video RAM, and generates, under instructions of the CPU 20, image data for a game screen (game image) to be displayed on the display 12 in the video RAM, and outputs the image data to the display 12. The D/A converter 34 converts sound data that is output from the CPU 20 into an analog sound signal that is output to the speaker 38.

In addition, as described above, when displaying a game screen on the monitor of the television receiver 60 and outputting a sound from the speaker of the television receiver 60, the CPU 20 transmits the AV data to the television receiver 60 via the lower terminal 36 and the charge stand 50.

The lower terminal 36 is a terminal for connecting with the charge stand 50, and is a terminal for connecting a power line from an electric power supply circuit that is incorporated in the charge stand 50 to a charge circuit for charging the battery built in the game apparatus 10 (main body apparatus 10a). Moreover, the lower terminal 36 is also a terminal for performing wire-communication with the charge stand 50.

In addition, the electric configuration of the game apparatus 10 shown in FIG. 3 is an example, and should not be limited. For example, a touch panel may be further provided as an input portion. In this case, the touch panel is provided on the display 12. Otherwise, a touch display that the touch panel is integrally formed with the display 12 may be used. Moreover, an inertial sensor (an acceleration sensor or/and gyro sensor) for detecting a direction (attitude) or/and movement of the game apparatus 10 may be provided.

Figure 4:
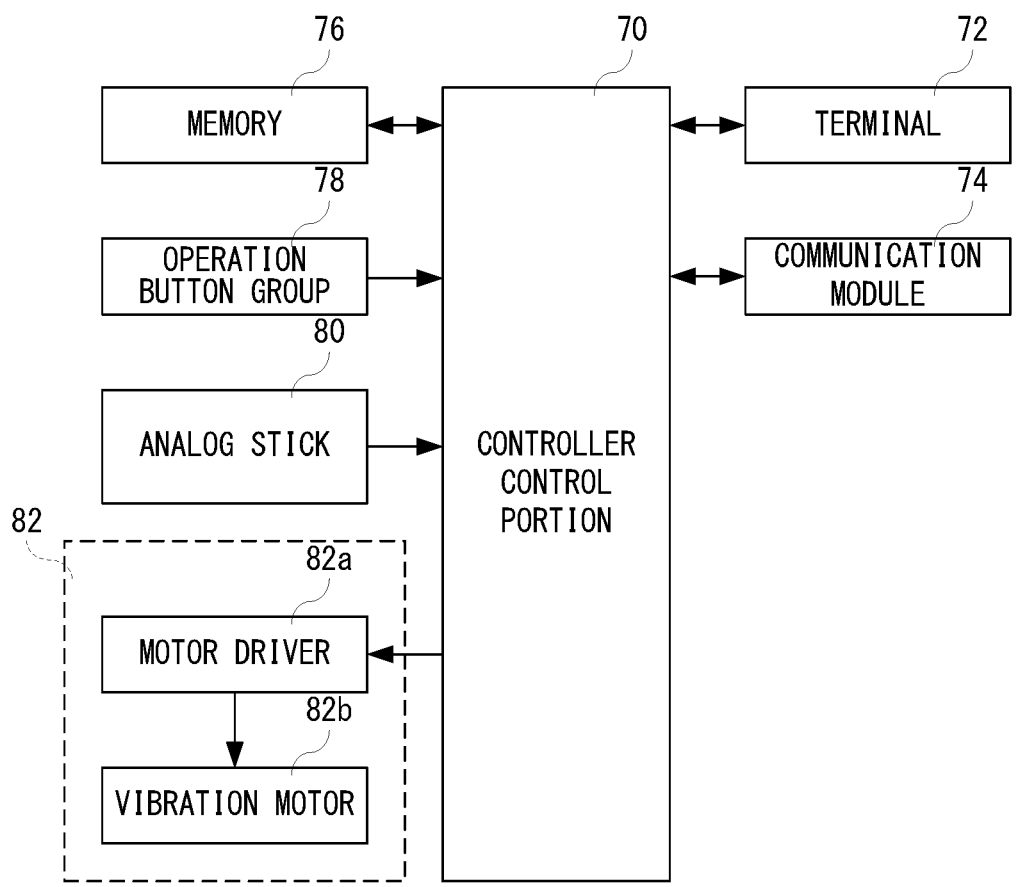
FIG. 4 is a block diagram showing a non-limiting example electric configuration of a first controller shown in FIG. 1 to FIG. 3.

FIG. 4 is a block diagram showing a non-limiting example electric configuration of the first controller 14 shown in FIG. 1 to FIG. 3. As shown in FIG. 4, the first controller 14 includes a controller control portion 70, and the controller control portion 70 is connected with a terminal 72, a communication module 74, a memory 76, an operation button group 78, an analog stick 80 and a vibration portion 82.

The controller control portion 70 includes a microcomputer(s), for example, and is in charge of overall control of the first controller 14. The terminal 72 is provided in order to electrically connect with the left terminal 28 of the main body apparatus 10a when the first controller 14 is attached to the main body apparatus 10a. The communication module 74 is provided in order to communicably connect with the main body apparatus 10a when the first controller 14 is separated from the main body apparatus 10a. As described above, since the wireless communication system according to the standard of Bluetooth (registered trademark) is adopted for the controller communication portion 26 provided in the main body apparatus 10a, and the communication module 74 also adopts a wireless communication system according to the standard of Bluetooth (registered trademark).

Therefore, when the first controller 14 is attached to the main body apparatus 10a, the controller control portion 70 receives operation data of the operation button group 78 or/and the analog stick 80, and outputs the received operation data from the terminal 72. On the other hand, when the first controller 14 is separated from the main body apparatus 10a, the controller control portion 70 receives the operation data as described above, and transmits the received operation data from the communication module 74 to the main body apparatus 10a according to the above-described wireless communication system.

Moreover, the controller control portion 70 receives (acquires), when the first controller 14 is attached to the main body apparatus 10a, the vibration data that is input from the terminal 72. On the other hand, the controller control portion 70 receives and acquires, when the first controller 14 is separated from the main body apparatus 10a, the vibration data as described above by the communication module 74.

The memory 76 is a nonvolatile storage device such as a flash memory, for example, and is stored with firmware and identification information (controller ID) of the first controller 14. The controller control portion 70 performs various kinds of processing by executing the firmware stored in the memory 76. Moreover, the controller control portion 70 notifies the controller ID to the main body apparatus 10a at the time that the first controller 14 is wireless-communicably connected with the main body apparatus 10a.

The operation button group 78 corresponds to various kinds of the operation buttons 14a described above, and the analog stick 80 corresponds to the analog stick 14b described above. Information about the operation performed to the operation button group 78 and the analog stick 80 (operation data) is repeatedly output to the controller control portion 70 at a predetermined period.

The vibration portion 82 includes a motor driver 82a and a vibration motor 82b, and the motor driver 82a is controlled by the controller control portion 70. The controller control portion 70 controls the vibration motor 82b according to the vibration data transmitted from the main body apparatus 10a. That is, upon receipt (acquisition) of the vibration data from the main body apparatus 10a, the controller control portion 70 outputs the acquired vibration data to the motor driver 82a. The motor driver 82a generates, from the vibration data from the controller control portion 70, a driving signal for making the vibration motor 82b vibrate, and applies the generated driving signal to the vibration motor 82b. Therefore, the vibration motor 82b operates according to the vibration data from the main body apparatus 10a.

For example, the vibration motor 82*b* is a linear motor, and outputs (vibrates) with a pattern according to an input waveform (vibration waveform) of an analog signal (vibration signal) such as a sound signal. However, in this embodiment, the vibration data is data of a set of a value of the frequency and a voltage value corresponding to the amplitude, which corresponds to a signal value (frequency and amplitude) at each time point of the analog signal (vibration signal). By being applied with a voltage value indicated by the vibration data so as to increase or decrease at a frequency indicated by the vibration data in accordance with the signal value at each time point of the vibration signal, a position of an internal weight is changed, whereby the linear motor as the vibration motor 82*b* can output (vibrate) with the pattern according to the input waveform.

In addition, although the linear motor is used as the vibration motor 82*b* in this embodiment, there is no necessity of being limited to this, and a piezoelectric element or a voice coil can be used, for example.

Moreover, the electric configuration of the first controller 14 shown in FIG. 4 is an example, and should not be limited. For example, an inertial sensor (an acceleration sensor or/and gyro sensor) for detecting a direction (attitude) or/and movement of the first controller 14 may be provided.

Figure 5:
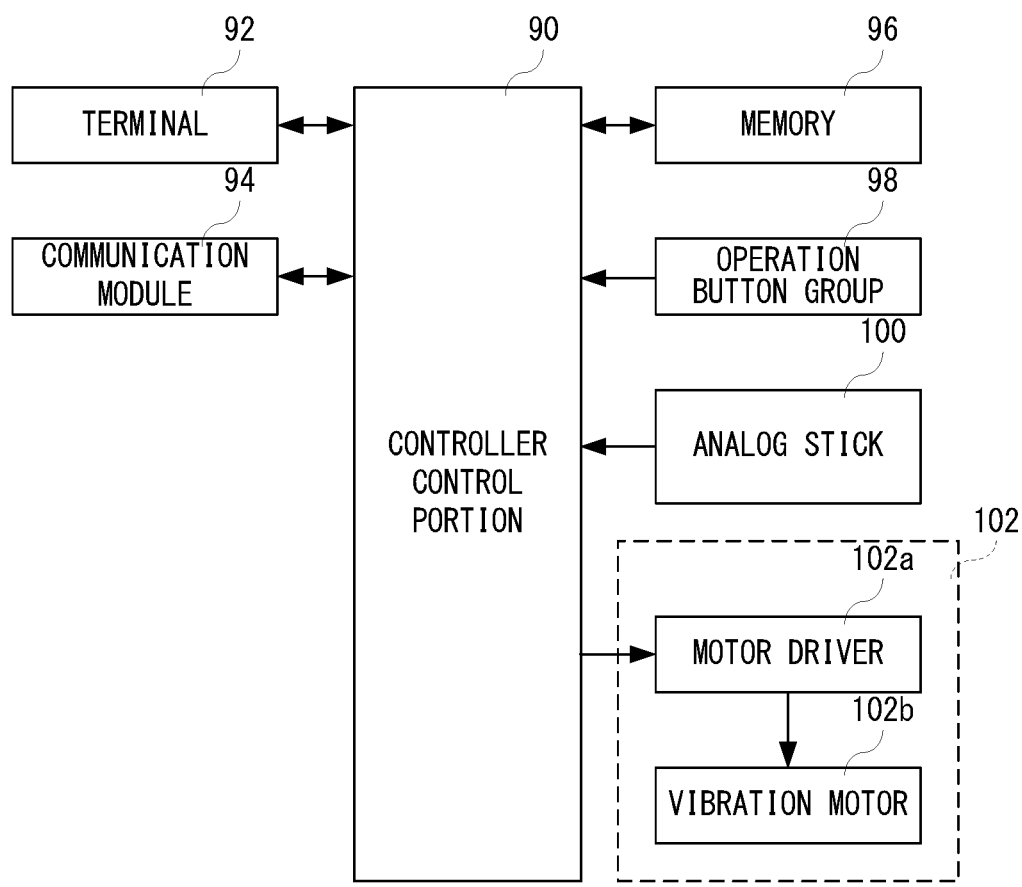
FIG. 5 is a block diagram showing a non-limiting example electric configuration of a second controller shown in FIG. 1 to FIG. 3.

FIG. 5 is a block diagram showing a non-limiting example electric configuration of the second controller 16 shown in FIG. 1 to FIG. 3. As shown in FIG. 5, the second controller 16 includes a controller control portion 90, and the controller control portion 90 is connected with a terminal 92, a communication module 94, a memory 96, an operation button group 98, an analog stick 100 and a vibration portion 102.

As shown in FIG. 5, the electric configuration of the second controller 16 is the same as the electric configuration of the first controller 14 shown in FIG. 4 in this embodiment, and therefore, a description about respective components thereof is omitted.

In addition, although the electric configurations of the first controller 14 and the second controller 16 are made the same in this embodiment, but need not be the same.

Figure 6:
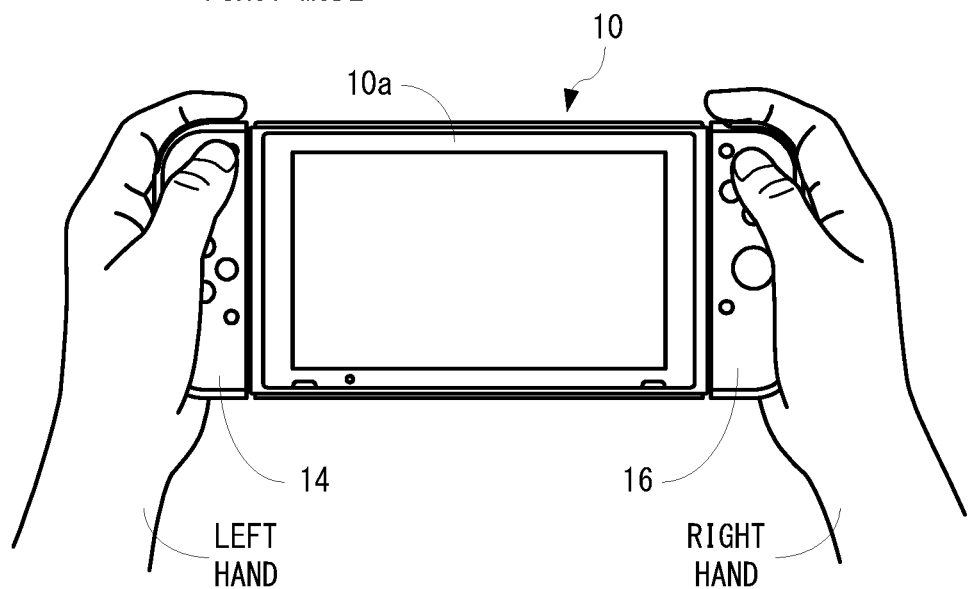
FIG. 6 is an illustration view showing a non-limiting example usage mode of the game apparatus shown in FIG. 1.

FIG. 6 is an illustration view showing a non-limiting example usage mode (first mode) of the game apparatus 10. As shown in FIG. 6, in the game apparatus 10 of the first mode, the first controller 14 and the second controller 16 are used in a state of being attached to the main body apparatus 10*a*. In this case, a player holds the game apparatus 10 with both hands, and operates the first controller 14 with the left hand and the second controller 16 with the right hand. That is, the game apparatus 10 functions as a portable game apparatus.

Therefore, when the first controller 14 is operated, operation data is input to the CPU 20 through the terminal 72 and the left terminal 28 from the controller control portion 70. Similarly, when the second controller 16 is operated, operation data is input to the CPU 20 through the terminal 92 and the right terminal 30 from the controller control portion 90.

Moreover, the vibration data from the CPU 20 is input to the controller control portion 70 via the left terminal 28 and the terminal 72 of the first controller 14. Similarly, the vibration data from the CPU 20 is input to the controller controlling portion 90 via the right terminal 30 and the terminal 92 of the second controller 16.

In the first controller 14, the controller control portion 70 inputs vibration data to the motor driver 82*a*, and the motor driver 82*a* drives the vibration motor 82*b* according to the vibration data. Moreover, in the second controller 16, the controller control portion 90 inputs vibration data to the motor driver 102*a*, and the motor driver 102*a* drives the vibration motor 102*b* according to the vibration data.

When the vibration motor 82*b* provided in the first controller 14 is driven, vibration that is generated by the vibration motor 82*b* is conveyed to the both hands holding the game apparatus 10. Moreover, when the vibration motor 102*b* provided in the second controller 16 is driven, vibration that is generated by the vibration motor 102*b* is conveyed to the both hands holding the hold of the game apparatus 10. That is, a player perceives the vibration with both hands.

In addition, the vibration motor 82*b* and the vibration motor 102*b* may be driven simultaneously, or may be driven severally. Moreover, the vibration data of the same content (frequency and voltage value) may be input to the vibration motor 82*b* and the vibration motor 102*b*, or the vibration data having different content may be input. These are true also for a second mode and a third mode respectively described later.

Figure 7:
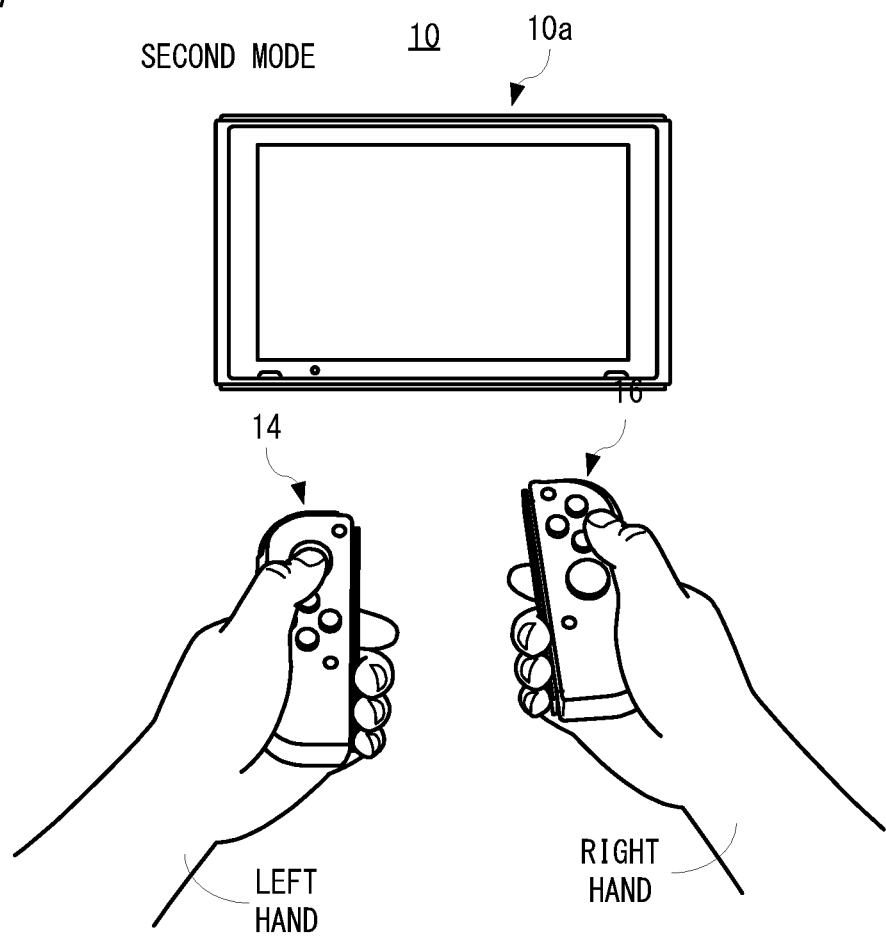
FIG. 7 is an illustration view showing another non-limiting example usage mode of the game apparatus shown in FIG. 1.

FIG. 7 is an illustration view showing another non-limiting example usage mode (second mode) of the game apparatus 10. As shown in FIG. 7, in the game apparatus 10 of the second mode, the first controller 14 and the second controller 16 are used in a state of being separated from the main body apparatus 10*a*. In this case, a player holds the first controller 14 with the left hand and the second controller 16 with the right hand, and the main body apparatus 10*a* is placed in a state of standing on a desk or stand. However, the state of standing the main body apparatus 10*a* means a state where the display surface of the display 12 provided on the main body apparatus 10*a* is perpendicular to the horizontal plane or slightly inclined from the vertical direction. For example, it is possible to render the main body apparatus 10*a* in a standing state by putting the main body apparatus 10*a* on the charge stand 50.

In the second mode, when the first controller 14 is operated, the operation data from the controller control portion 70 is transmitted from the communication module 74, and is received in the controller communication portion 26 to be input to the CPU 20. Similarly, when the second controller 16 is operated, the operation data from the controller control portion 90 is transmitted from the communication module 94, and is received in the controller communication portion 26 to be input to the CPU 20.

Moreover, the vibration data from the CPU 20 is transmitted from the controller communication portion 26, and is received by the communication module 74 of the first controller 14 to be input to the controller control portion 70. Similarly, the vibration data from the CPU 20 is transmitted from the controller communication portion 26, and is received by the communication module 94 of the second controller 16 to be input to the controller control portion 90.

As described for the first mode, the vibration motor 82*b* of the first controller 14 is driven according to the vibration data from the controller control portion 70, and the vibration motor 102*b* of the second controller 16 is driven according to the vibration data from the controller control portion 90.

When the vibration motor 82*b* provided in the first controller 14 is driven, the vibration generated by the vibration motor 82*b* is conveyed to the left hand that holds the first controller 14, and when the vibration motor 102*b* provided in the second controller 16 is driven, the vibration generated by the vibration motor 102*b* is conveyed to the right hand that holds the second controller 16. That is, a player perceives the vibration by the left hand and the right hand, respectively.

In addition, when the first controller 14 and the second controller 16 are used while being separated from the main body apparatus 10a, it is necessary to wirelessly communicably connect them with the main body apparatus 10a. Since the wireless communication is performed according to the standard of Bluetooth (registered trademark) in this embodiment, at the time that the power of the game apparatus 10 (main body apparatus 10a) is turned on, or at the time that an application such as a game is started, the main body apparatus 10a is connected to (paired with) the controllers (14, 16, etc.).

In this case, the main body apparatus 10a (parent machine) is set in a mode (pairing mode) capable of searching the controller (child machine such as 14, 16 etc.), whereas the controller (14, 16 etc.) is also set in a pairing mode capable of searching the main body apparatus 10a by operating a predetermined operation button (14a, 16a etc.). When the main body apparatus 10a searches the controller (14, 16, etc.) that emits a predetermined signal and detects the controllers (14, 16, etc.), connection is performed. When the connection is completed, the main body apparatus 10a is registered with identification information (controller ID) of the connected controller (14, 16, etc.). This is true for a case where a further controller such as a third controller 120 described later is wirelessly communicably connected to the main body apparatus 10a.

Figure 8:
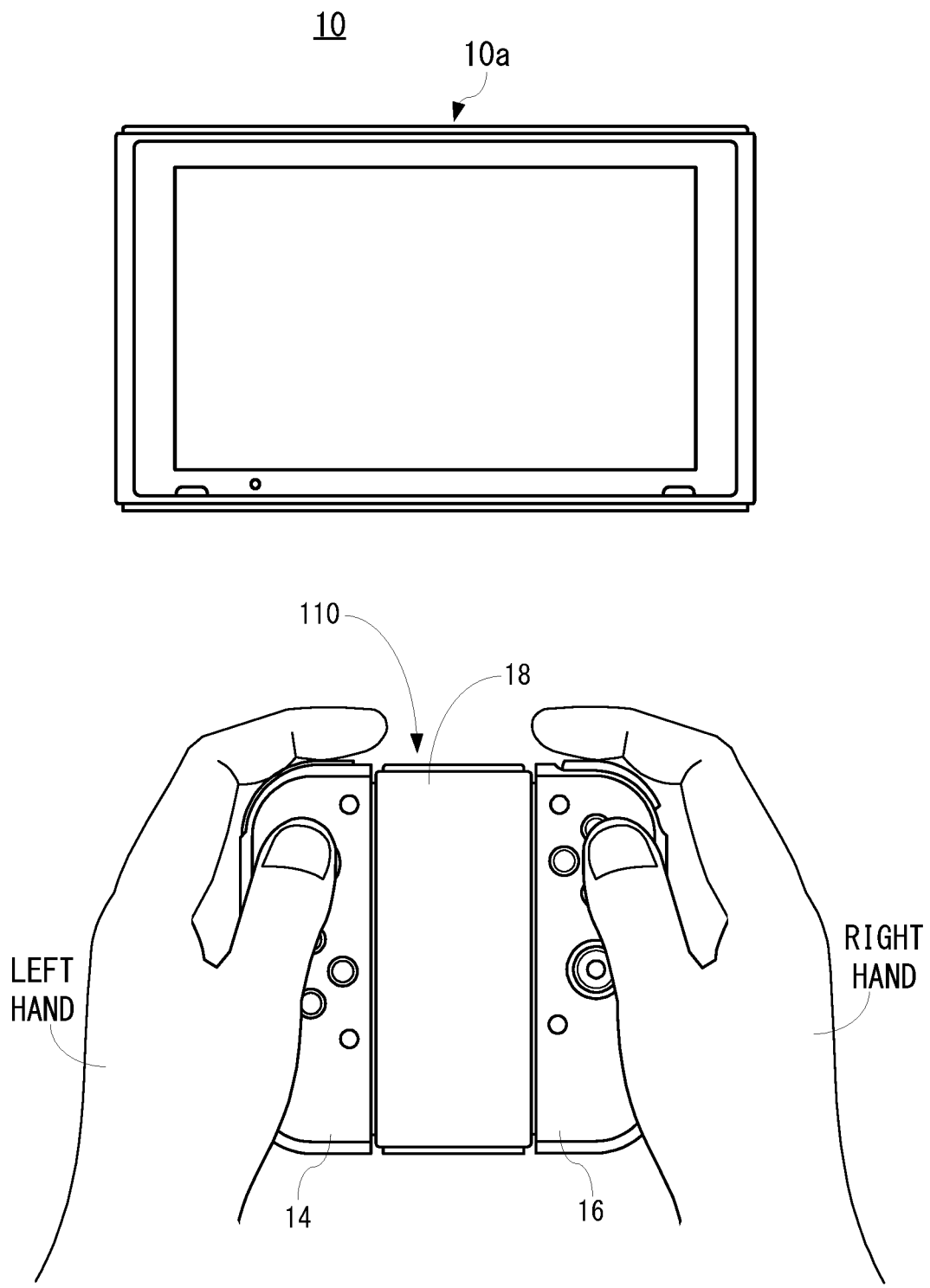
FIG. 8 is an illustration view showing a still another non-limiting example usage mode of the game apparatus shown in FIG. 1.

FIG. 8 is an illustration view showing another non-limiting example usage mode (third mode) of the game apparatus 10. As shown in FIG. 8, in the game apparatus 10 of the third mode, the first controller 14 and the second controller 16 are used in a status of being separated from the main body apparatus 10a, like a case of the second mode. However, in the third mode, the first controller 14 and the second controller 16 are coupled to each other using a connection member 18 so as to be used as a single controller that the first controller 14 and the second controller 16 are provided integrally (hereinafter, may be called a "controller 110").

Although a detailed description is omitted, the connection member 18 is formed in a shape of a quadrangular prism or a hollow hexahedron, and a rail member that is the same as the rail member 10b is provided on a surface (first side surface) that the first controller 14 is attached/detached and a rail member that is the same as the rail member 10c is provided on a surface (second side surface) that the second controller 16 is attached/detached. However, the first side surface is a surface opposite to the second side surface.

In the third mode, a player operates the first controller 14 with the left hand and the second controller 16 with the right hand while holding the controller 110 with both hands. Moreover, the main body apparatus 10a is placed in a state of standing on a desk or stand, like the second mode.

Therefore, when the first controller 14 is operated, operation data from the controller control portion 70 is transmitted from the communication module 74, and is received by the controller communication portion 26 to be input to the CPU 20. Similarly, when the second controller 16 is operated, operation data from the controller control portion 90 is transmitted from the communication module 94, and is received by the controller communication portion 26 to be input to the CPU 20.

Moreover, vibration data from the CPU 20 is transmitted from the controller communication portion 26, and is received by the communication module 74 of the first controller 14 to be input to the controller control portion 70. Similarly, the vibration data from the CPU 20 is transmitted from the controller communication portion 26, and is received by the communication module 94 of the second controller 16 to be input to the controller control portion 90.

Also in this case, as described in the first mode, the vibration motor 82b of the first controller 14 is driven according to the vibration data from the controller control portion 70, and the vibration motor 102b of the second controller 16 is driven according to the vibration data from the controller control portion 90.

When the vibration motor 82b provided in the first controller 14 is driven, vibration generated by the vibration motor 82b is conveyed to the both hands that hold the controller 110. Moreover, when the vibration motor 102b provided in the second controller 16 is driven, vibration generated by the vibration motor 102b is conveyed to the both hands that hold the controller 110. That is, a player perceives the vibration with both hands.

FIG. 9 is an illustration view showing a further non-limiting example usage mode (fourth mode) of the game apparatus 10. As shown in FIG. 9, in the game apparatus 10 of the fourth mode, a third controller 120 is used instead of the first controller 14 and the second controller 16. In this case, the game apparatus 10 is constituted by the main body apparatus 10a and the third controller 120.

In addition, although the first controller 14 and the second controller 16 are separated from the main body apparatus 10a in an example shown in FIG. 9, if not using the first controller 14 and the second controller 16, these may be in a state of being attached to the main body apparatus 10a.

In the fourth mode, a player holds and operates the third controller 120 with both hands. Moreover, the main body apparatus 10a is placed in a state of standing on a desk or stand, like the second mode and the third mode.

The third controller 120 is provided with various kinds of operation buttons 120a and two left and right analog sticks (a left analog stick 158 and a right analog stick 160) 120b. Moreover, the third controller 120 is provided with two vibration motors (vibration motor 162b and vibration motor 164b) 120c in interiors of two left and right grip portions. The third controller 120 having such a configuration is the same as the controller 110 of the third mode about a function of being operated and a function making vibration to be perceived, but it is possible to say that this is a controller that can be held more easily than the controller 110.

Figure 10:
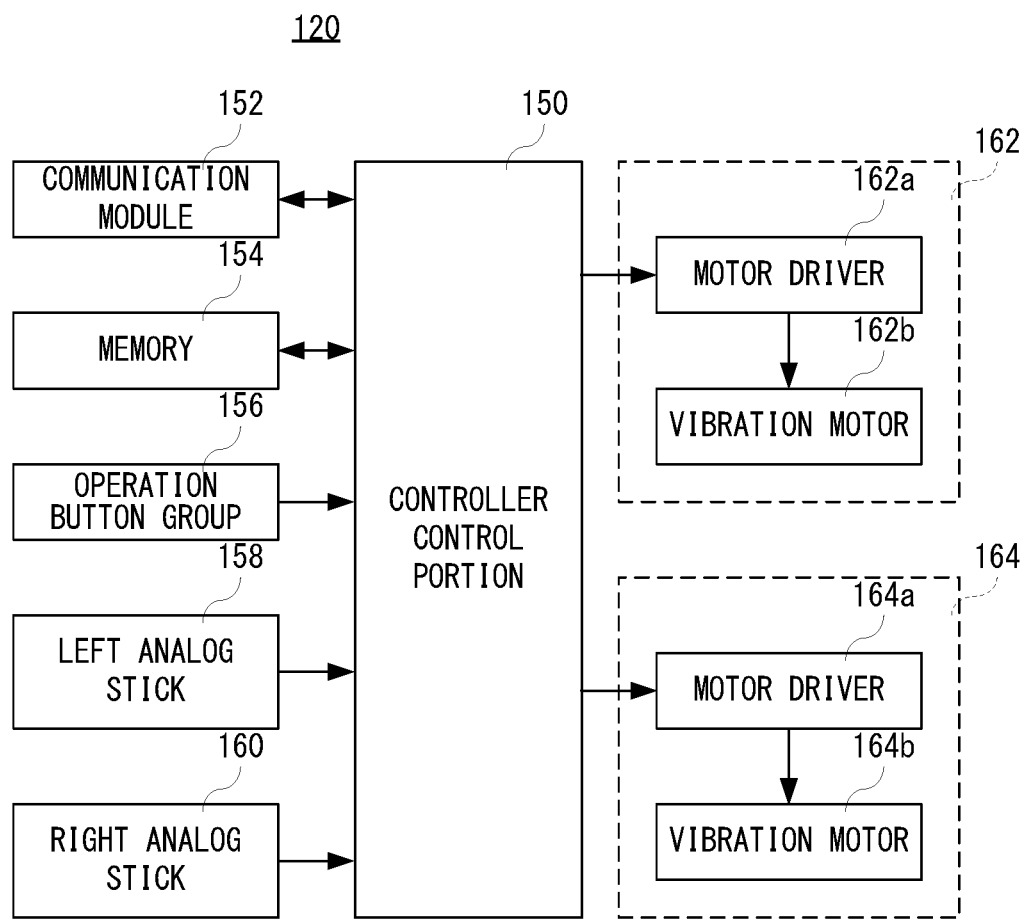
FIG. 10 is a block diagram showing a non-limiting example electric configuration of a third controller shown in FIG. 9.

FIG. 10 is a block diagram showing a non-limiting example electric configuration of the third controller 120. As shown in FIG. 10, the third controller 120 includes a controller control portion 150, and the controller control portion 150 is connected with a communication module 152, a memory 154, an operation button group 156, a left analog stick 158, a right analog stick 160, a left vibration portion 162 and a right vibration portion 164. The left vibration portion 162 includes a motor driver 162a and a vibration motor 162b, and the motor driver 162a is connected to the controller control portion 150. Moreover, the right vibration portion 164 includes a motor driver 164a and a vibration motor 164b, and the motor driver 164a is connected to the controller control portion 150. Moreover, the operation button group 156 corresponds to various kinds of operation buttons 120a.

Since respective components shown in FIG. 10 have the same function as those of respective components provided in the first controller 14 shown in FIG. 4, a duplicate description is omitted.

In addition, since the third controller 120 is not attached to the main body apparatus 10a, terminals like the terminal 72 and the terminal 92 are not provided. However, when making the third controller 120 connectable with the main body apparatus 10a using a signal cable, terminals for connecting the signal cable are provided in the main body apparatus 10a and the third controller 120, respectively.

In the fourth mode, when the third controller 120 is operated, operation data from the controller control portion 150 is transmitted from the communication module 152, and is received by the controller communication portion 26 to be input to the CPU 20.

Moreover, the vibration data from the CPU 20 is transmitted from the controller communication portion 26, and is received by the communication module 152 of the third controller 120 to be input to the controller control portion 150. In the third controller 120, according to the vibration data, the controller control portion 150 drives the vibration motor 162b of the left vibration portion 162 and the vibration motor 164b of the right vibration portion 164. However, the vibration data transmitted from the CPU 20 may have the same content for the vibration motor 162b and the vibration motor 164b, or may have different contents.

When the vibration motor 162b provided in the left grip portion of the third controller 120 is driven, vibration generated by the vibration motor 162b is conveyed to both hands that hold the third controller 120. Moreover, when the vibration motor 164b provided in the right grip portion of the third controller 120 is driven, vibration generated by the vibration motor 164b is conveyed to both hands that hold the third controller 120. That is, a player perceives the vibration with both hands.

Although the third controller 120 having a shape as shown in FIG. 9 is used in this embodiment as the further controller different from the first controller 14 and the second another controller 16, the shape of the further controller does not need to be limited. For example, as the further controller, controllers of other shapes may be used, such as a shape of the model gun, a shape imitating an animation character or game character, a shape imitating an instrument, a shape imitating a writing instrument. Thus, it is possible to use, as the further controller, not only a controller whose housing has a further shape but also a controller attaching the first controller 14 or/and the second controller 16 to an attachment. For example, an attachment having a shape imitating a handle of cars or airplanes, an attachment having a shape of a model gun, an attachment having a shape imitating a sword, or the like can be used.

For example, when a shape of a controller differs, it is conceivable that a weight of the controller also differs. Moreover, when a shape of a controller differs, it is conceivable that a locating position of the vibration motor incorporated in the housing of the controller also differs. These are true for a case where the first controller 14 or/and the second controller 16 are attached to the attachment. That is, a characteristic as a whole apparatus differs in a case of the first mode that the first controller 14 and the second controller 16 are attached to the main body apparatus 10a and the game apparatus 10 is vibrated, a case of the second mode that the first controller 14 and the second controller 16 are individually vibrated, a case of the third mode that the first controller 14 and the second controller 16 (controller 110) are integrally vibrated, or a case of the fourth that the further controller such as the third controller 120 is vibrated. However, in this embodiment, the term "apparatus" means the game apparatus 10, the first controller 14, the second controller 16, the controller 110 or the further controller (the third controller 120 etc.). Moreover, the characteristic of the whole apparatus means at least one of a form or shape of the whole apparatus, a weight of the whole apparatus and an arranging position of the vibration motor in the whole apparatus. It is conceivable that when the characteristic of the whole apparatus differs, the vibration to be perceived by the player also differs.

Figure 11:
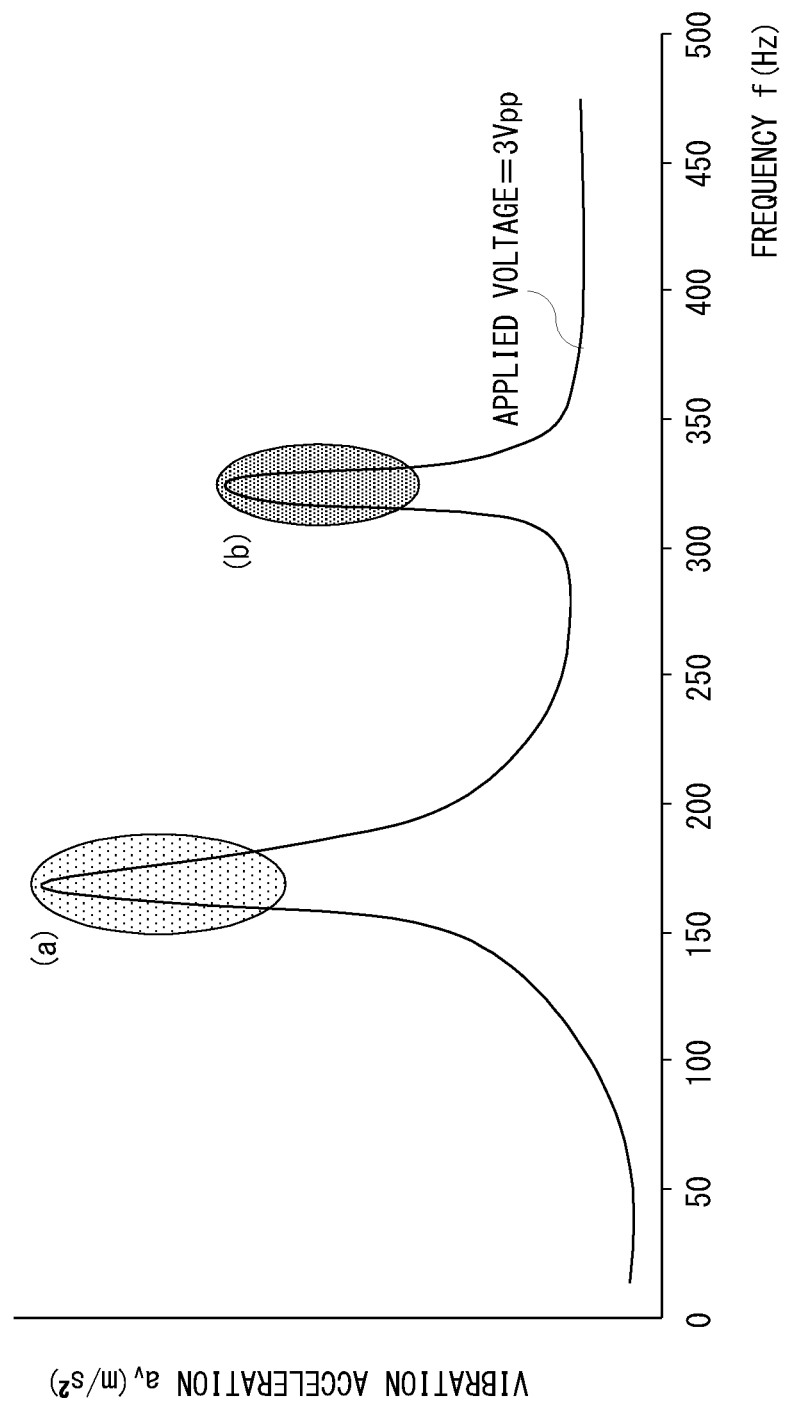
FIG. 11 is an illustration view showing a non-limiting example graph that shows a change of a vibration acceleration corresponding to a frequency when applying a predetermined voltage to a vibration motor that is incorporated in each controller.

FIG. 11 is a non-limiting example graph that shows a change of a vibration acceleration $a_v$ (m/s$^2$) corresponding to a frequency f (Hz) when applying a predetermined voltage E (here, 3 Vpp of a rated value) to the vibration motor 82b, 102b, and 162b and 164b (14c, 16c, and 120c) provided in the first controller 14, the second controller 16, and the third controller 120. Here, the vibration acceleration $a_v$ means a value indicative of a difference between a maximum value and a minimum value of an acceleration of a body to be vibrated when a predetermined voltage E is applied. Although the vibration acceleration $a_v$ is a value that differs dependent on a weight etc. of the product incorporating the vibration motor(s) 82b, 102b, 162b, 164b, in FIG. 11, a relationship between the applied voltage E and the vibration acceleration $a_v$ under a specific condition is shown.

When the frequency f is constant, the larger vibration acceleration $a_v$, the vibration having the larger amplitude A becomes. On the other hand, when the vibration acceleration $a_v$ is constant, the higher frequency f, the vibration having the smaller amplitude A becomes.

As shown in FIG. 11, for the vibration motor 82b, 102b, 162b or 164b used in this embodiment, the vibration acceleration $a_v$ changes between approximately 100 Hz and 500 Hz of the frequency f. Therefore, as for the vibration motor 82b, 102b, 162b or 164b, the vibration acceleration $a_v$ is changed, and further, the amplitude is changed by changing the frequency f. Moreover, as seen from the graph in FIG. 11, the vibration motor 82b, 102b, 162b or 164b used in this embodiment is such a vibration motor having resonance frequencies at two points near 160 Hz (portion (a) in FIG. 11) and near 320 Hz (portion (b) in FIG. 11) and thus the vibration acceleration $a_v$ becomes large at the two points.

In addition, since the weight is vibrated obliquely with respect to a housing of the vibration motor in the vibration motor 82b, 102b, 162b or 164b used in this embodiment, it is constituted to have two resonance frequencies corresponding to a longitudinal direction and a lateral direction of the housing of the vibration motor.

In this embodiment, the vibration data is input to an operating system from an application program. Then, the vibration data is transmitted to the first controller 14, the second controller 16 or the third controller 120 from the operating system. Since the application program and the operating system are executed by the CPU 20, respectively, the CPU 20 functions as an application execution portion and an operating system execution portion. Moreover, since the operating system execution portion controls main body functions, the CPU 20 functions also as a vibration control portion that controls the vibration of the vibration motor 82b, 102b, 162b or 164b.

As described above, in this embodiment, the controller to be used may be changed according to the usage mode of the game apparatus 10, and a communication method that the vibration data is transmitted to the first controller 14 and the second controller 16 may differ. Therefore, in this embodiment, it is constituted to determine the usage mode of the game apparatus 10 at the timing that an application that contains the vibration control is started, the timing that a predetermined event occurs, and so on.

However, it is determined whether the first controller 14 and the second controller 16 are attached to the main body apparatus 10a prior to determining the usage mode of the game apparatus 10, and when the first controller 14 and the second controller 16 are separated from the main body apparatus 10*a*, the pairing processing is performed between the main body apparatus 10*a* and each of the first controller 14, the second controller 16 and the further controller (the third controller 120).

For example, when the application program of a game is to be executed, the player selects, with referring to a setting screen (not shown) of the usage mode of the game apparatus 10, the game is to be played with which one of the usage modes of the first mode to the fourth mode. Moreover, in the fourth mode, there is an occasion that a further controller such as the third controller 120 etc. can be selected. This selection result is notified to the operating system that controls the main body functions. However, dependent on the kind of the application, the usage mode of the game apparatus 10 determined in advance or/and presence or absence of use of the further controller such as the third controller 120 may be forcedly selected.

In addition, as described later, when playing a game by a plurality of players, a controller to be used is selected for each player. Therefore, when playing a game by a plurality of players, an application program identifies a controller to be used for each player, and then, instructs the operating system to generate vibration in a controller used by a player to whom the vibration is to be presented, and sends (inputs) the vibration data for the vibration to be presented.

When the game apparatus 10 is used in the first mode, the CPU 20 transmits the vibration data to the first controller 14 and the second controller 16 by wire-communication. Moreover, when the game apparatus 10 is used in the second mode or the third mode, the CPU 20 transmits the vibration data to the first controller 14 and the second controller 16 by wireless communication. The vibration motor 82*b* is driven according to the vibration data from the controller control portion 70 in the first controller 14, and the vibration motor 102*b* is driven according to the vibration data from the controller control portion 90 in the second controller 16. The applied voltage E having a voltage value indicative of the amplitude A included in the vibration data is applied to the vibration motor 82*b* and the vibration motor 102*b*. However, the amplitude is not uniquely determined with respect to the voltage value specified by the vibration data, but the amplitude of actual vibration is determined by the frequency f of vibration and the characteristic of the housing of the device.

Here, as shown in FIG. 11, even if the voltage E of the same voltage value (in FIG. 11, 3 Vpp) is applied, the vibration acceleration $a_v$ generated by the vibration motors 82*b* and 102*b* differ depending on the frequency fat which the voltage is increased or decreased. Especially, the vibration acceleration $a_v$ becomes larger in a frequency band including the resonance frequency and neighboring frequencies, and depending on the vibration characteristic of the housing of the first controller 14 or the second controller 16, an unpleasant sound (chatter sound) may be generated as rattle (rattling).

In this embodiment, as for the vibration data comprising a set of a value indicative of the frequency f and a voltage value indicative of the amplitude A, when the frequency f is the resonance frequency or neighboring frequencies, by multiplying the applied voltage E of the voltage value indicating the amplitude A by a predetermined coefficient (limiter coefficient), the applied voltage E that is to be actually input to the vibration motor 82*b* or 102*b* is decreased. That is, a magnitude of the applied voltage E is limited at the resonance frequency or neighboring frequencies. Thus, it is possible to present the vibration with substantially uniform vibration acceleration $a_v$ in an entire frequency band (for example, 80 Hz to 600 Hz) that the vibration is to be presented by the vibration motor 82*b* or 102*b* of this embodiment.

Figure 12:
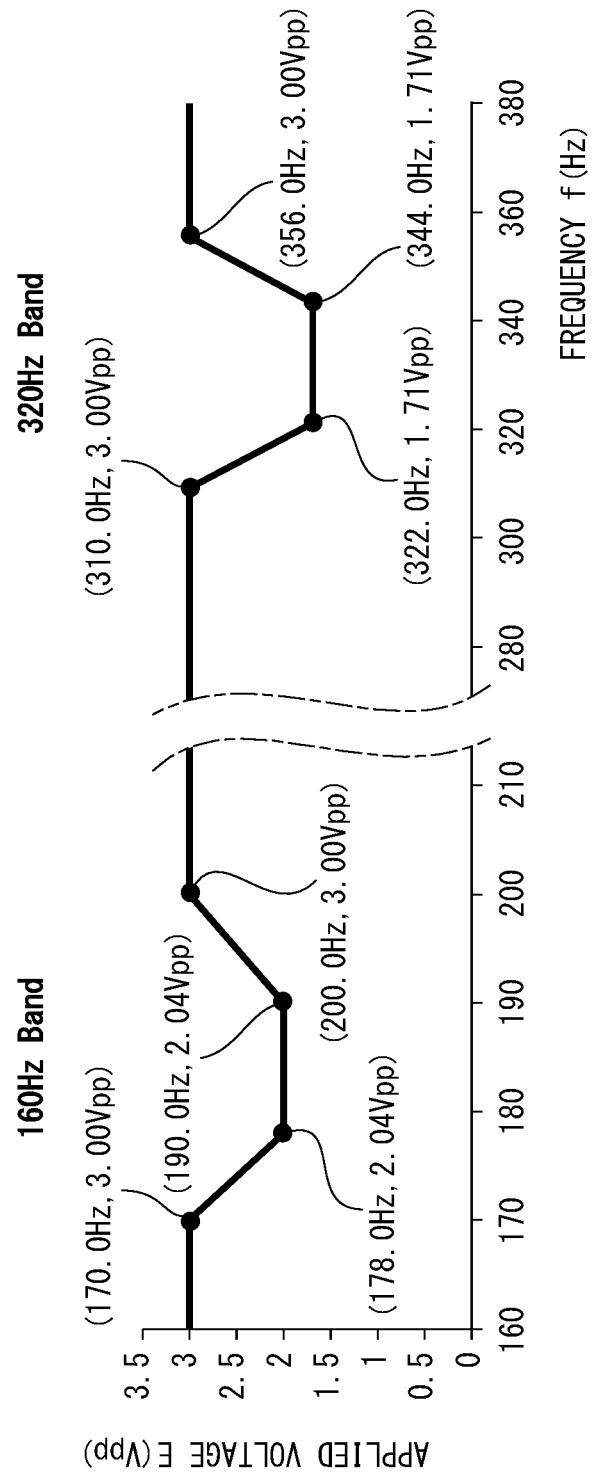
FIG. 12 is an illustration view showing a non-limiting example graph that shows a change of a voltage applied to a vibration motor that is incorporated in a controller included in the game apparatus corresponding to a frequency, in first to third usage modes.

FIG. 12 is a non-limiting example graph that shows a change of the applied voltage E to the first controller 14 and the second controller 16 corresponding to the frequency in this embodiment. FIG. 12 illustrates only a partial frequency band including two resonance frequencies in the entire frequency band that the vibration is to be presented. This is true for FIG. 13 described later.

As shown in FIG. 12, the voltage E of the rated value (3 Vpp) is applied at frequencies f from 160 Hz to 170 Hz, and the applied voltage E is linearly decreased at frequencies f from 170 Hz to 178 Hz. The voltage E of 2.04 Vpp is applied at a frequency f of 178 Hz. The voltage E of 2.04 Vpp is applied at frequencies f from 178 Hz to 190 Hz, and the applied voltage E is increased linearly up to the rated value (3 Vpp) from 190 Hz to 200 Hz. The voltage E of the rated value (3 Vpp) is applied at frequencies f from 200 Hz to 310 Hz, and the applied voltage E is linearly decreased from 310 Hz to 322 Hz. The voltage E of 1.71 Vpp is applied at a frequency f of 322 Hz. The voltage E of 1.71 Vpp is applied at frequencies f from 322 Hz to 344 Hz, and the applied voltage E is linearly increased up to the rated value (3 Vpp) from 344 Hz to 356 Hz. The voltage E of the rated value (3 Vpp) is applied at frequencies f from 356 Hz to 380 Hz.

Thus, in this embodiment, the applied voltage E is decreased in a relatively wide frequency band. As described above, in this embodiment, it is controlled so that the applied voltage E is decreased at the resonance frequency and near the resonance frequency of the vibration motor 82*b* or 102*b*. However, the resonance frequency of the vibration motor 82*b* or 102*b* may be slightly different for each individual due to manufacturing error or the like. By decreasing the applied voltage E in a relatively wide frequency band as in this embodiment, it is possible to cope with the difference between individuals.

In addition, the graph shown in FIG. 12, for the convenience of the drawing, a scale width is changed in the first half of the frequency band (frequencies f from 160 Hz to 210 Hz) and the second half (frequencies f from 280 Hz to 380 Hz). This is true for the graph shown in FIG. 13.

In this embodiment, as described above, when using the game apparatus 10 in the fourth mode, the third controller 120 is used instead of the first controller 14 and the second controller 16.

Moreover, when the game apparatus 10 is used in the fourth mode and the third controller 120 is used as the further controller, the CPU 20 transmits the vibration data to the third controller 120 by wireless communication. In the third controller 120, the vibration motor 162*b* and the vibration motor 164*b* are driven according to the vibration data from the controller control portion 150. In also the fourth mode, the voltage E of the voltage value indicating the amplitude A included in the vibration data is applied to the vibration motor 162*b* and the vibration motor 164*b*.

Figure 13:
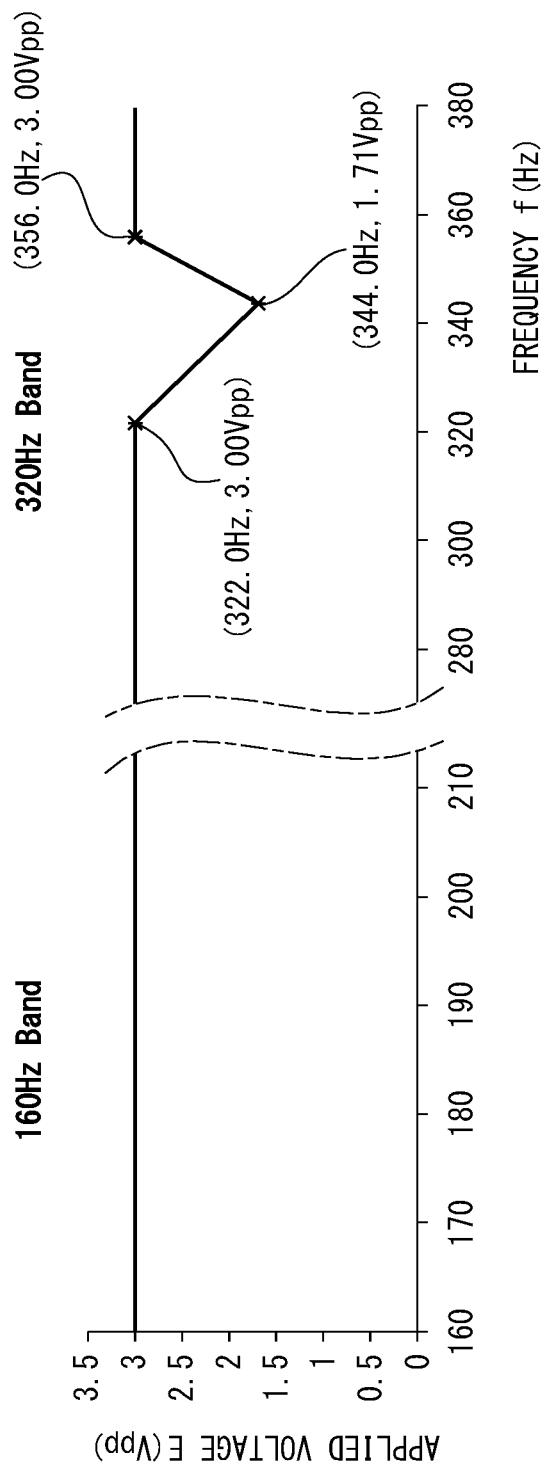
FIG. 13 is an illustration view showing a non-limiting example graph that shows a change of a voltage applied to a vibration motor that is incorporated in a further controller different from a controller included in the game apparatus corresponding to a frequency, in a fourth usage mode.

FIG. 13 is a non-limiting example graph that shows a frequency change of the applied voltage E to the third controller 120 in this embodiment.

As shown in FIG. 13, when using the third controller 120 in the fourth mode, the voltage E of the rated value (3 Vpp) is applied at frequencies f from 160 Hz to 322 Hz, and the applied voltage E is linearly decreased from 322 Hz to 344 Hz. The voltage E of 1.71 Vpp is applied at a frequency f of 344 Hz. The applied voltage E is linearly increased up to the rated value (3 Vpp) at frequencies f from 344 Hz to 356 Hz.

The voltage E of the rated value (3 Vpp) is applied at frequencies f from 356 Hz to 380 Hz.

When using the third controller 120 in the fourth mode, as compared with one of the first mode to the third mode, a frequency band width that the applied voltage E is to be decreased is narrow. Moreover, as shown in FIG. 13, in the frequency band of the resonance frequency of 160 Hz and its near, the applied voltage E is not decreased. Furthermore, a frequency band that the applied voltage E is decreased is made narrow also in the frequency band of the resonance frequency of 320 Hz and its near.

Thus, a reason why the voltage E having a change manner different from those in one of the first to third modes is applied when using the third controller 120 in the fourth mode is that since the third controller 120 is heavier than the controller 110, if the voltage E having the same value as the vibration motor 82b or 102 of the first controller 14 or the second controller 16 is applied, the vibration to be conveyed becomes weak. That is, it is because the characteristics of the devices to be vibrated differ. Moreover, in the third controller 120, even in a frequency band including the resonance frequency of 320 Hz and neighbouring frequencies, the vibration is not intensified as the unpleasant sound (chatter sound) is generated, so the voltage value is locally decreased.

Therefore, in the fourth mode, it is intended to make the player perceive the vibration with the same or similar intensity when using either the controller 110 or the third controller 120 by making the applied voltage E larger than those of the first to third modes within a range not exceeding the rated value (3 Vpp) in the entire frequency band that the vibration is to be presented.

In addition, it is not necessary to make the vibration perceived by the player be the same necessarily for each usage mode. As described above, also in this embodiment, in the first to third embodiments, a changing rate of the voltage E applied to the first controller 14 and the second controller 16 is made to be the same in the entire frequency band that the vibration is to be presented. That is, the vibration is not controlled for each usage mode in the first-third modes. This is because even if there is a difference in the vibration perceived by the player in a case where the usage mode is largely different as in the first-third modes in this embodiment, it is easy for the player to recognize a reason why the vibration differs, and thus, it is difficult for the player to feel uncomfortable. On the other hand, since the third mode and the fourth mode are modes that the controller (110, 120) is held with both hands, and thus, the usage modes are close to each other, an uncomfortable feeling due to a difference in vibration is likely to occur. Therefore, the control between the third mode and the fourth mode as in the embodiment is suitable.

However, as described above, the whole game apparatus 10 that the main body apparatus 10a and the controller (14, 16) are integrated vibrated in the first mode, the first controller 14 and the second controller 16 are respectively vibrated in the second mode, and the controller 110 integrated to be connected by the connection member 18 is vibrated in the third mode, and therefore, when making the vibration motor 82b or 102b vibrate with the same amplitude A and the same frequency f, the vibration that the player perceives becomes different in each of the first-third modes. Therefore, in each of the first-third modes, a changing rate of the applied voltage E may be controlled for each frequency band according to the characteristics of the vibrating bodies in each of the modes, i.e. the whole game apparatus 10, the respective controllers (14, 16) or the integrated controller 110 (14+16).

In the above examples, description is made on a case where the first controller 14 and the second controller 16 that constitute the game apparatus 10 are used, and a case where instead of the first controller 14 and the second controller 16, the third controller 120 that is different from these controllers (14, 16) is used. However, in the game apparatus 10 of this embodiment, while using the first controller 14 and the second controller 16, the third controller 120 can be also used simultaneously.

Figure 14:
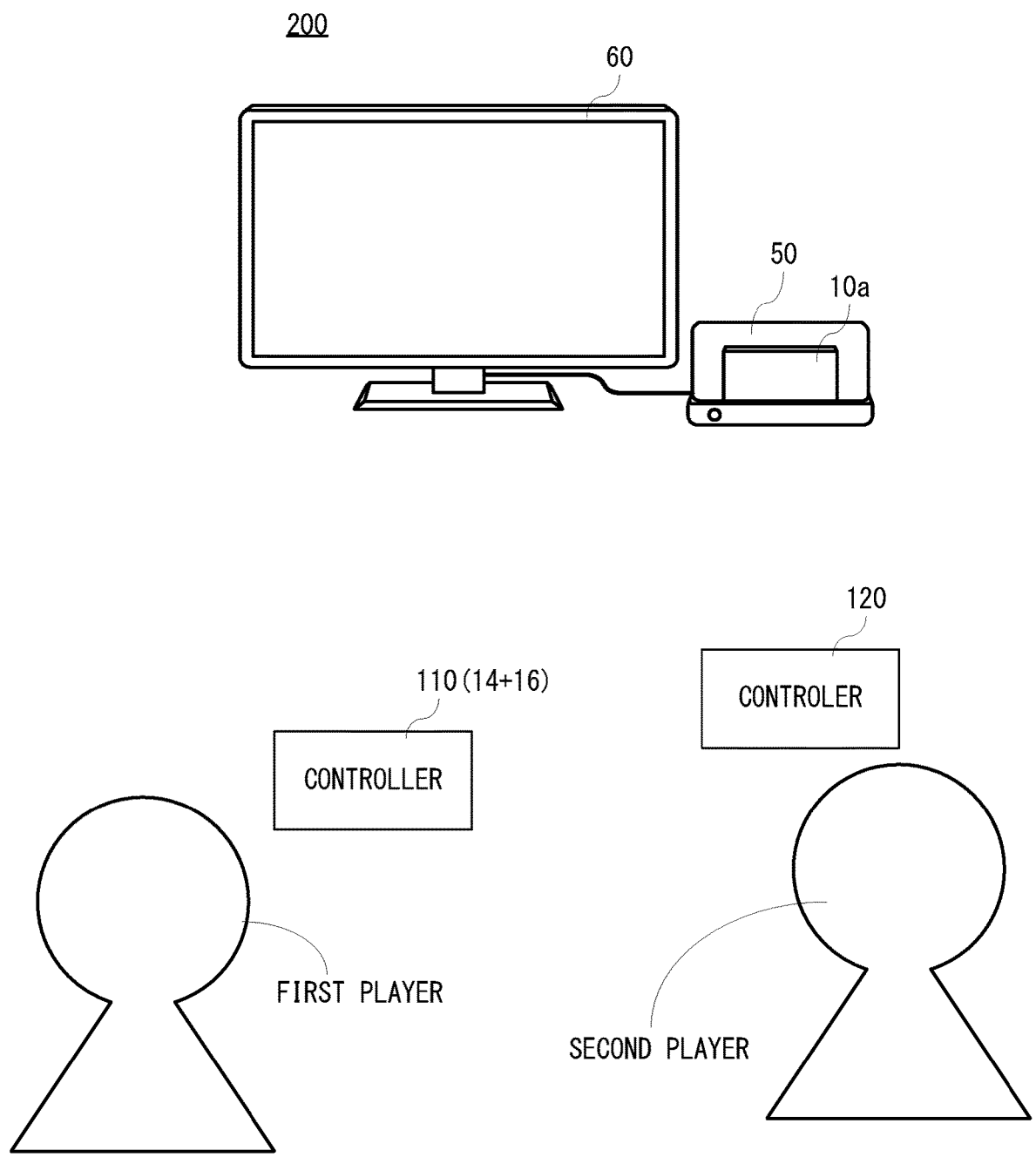
FIG. 14 is an illustration view showing a non-limiting example game system of this embodiment.

FIG. 14 is an illustration view showing a non-limiting example game system (vibration control system) 200 of this embodiment. As shown in FIG. 14, the game system 200 includes the game apparatus 10 and the third controller 120, and the third controller 120 is used together with the first controller 14 and the second controller 16 (controller 110) that constitute the game apparatus 10. Therefore, when the vibration data is transmitted to the first controller 14, the second controller 16 and the third controller 120 simultaneously from the main body apparatus 10a, the controller 110 and the third controller 120 can be vibrated simultaneously.

The game system 200 further comprises a charge stand 50 and a television receiver 60, and the charge stand 50 is connected to the television receiver 60 using a cable such as an HDMI (registered trademark) cable, and the main body apparatus 10a is put on the charge stand 50 in a state capable of performing communication with this charge stand 50. Therefore, when AV data is transmitted to the television receiver 60 from the main body apparatus 10a, a game screen is displayed on a monitor of the television receiver 60, and a voice or/and music is output from a speaker of the television receiver 60.

Moreover, in the game system 200, two players play the game when a first player uses the controller 110 and a second player uses the third controller 120. In this case, the game apparatus 10 is used in the third mode. However, the first player may use the first controller 14 and the second controller 16 individually. That is, it is possible to use the game apparatus 10 in the second mode.

In such game system 200, the main body apparatus 10a is communicably connected with not only the first controller 14 and the second controller 16 but third controller 120. In this case, the main body apparatus 10a acquires the identification information of the first controller 14, the second controller 16 and the third controller 120.

Moreover, it is necessary for the main body apparatus 10a to know whether the game apparatus 10 is to be used in the second mode or in the third mode. However, when the third controller 120 is used in addition to the first controller 14 and the second controller 16, the third controller 120 is subjected to vibration control as in a case of the fourth mode. That is, the coefficient data in the case of the fourth mode is used.

Therefore, when an application program of a game is executed as described above, when playing the game by two or more persons is selected, each player selects the controller to be used. Moreover, the player that uses the first controller 14 and the second controller 16 further selects whether the game apparatus 10 is to be used in the second mode or the third mode.

In the game system 200, the application program also notifies information on the usage mode of the game apparatus 10 to the operating system that controls execution of the main body functions.

However, in the main body apparatus 10a, the application program identifies the player that uses the controller 110 (the first controller 14 and the second controller 16), and the player that uses the third controller 120. The application program determines the controller that is used by the player to whom the vibration is to be presented, and instructs the operating system to generate the vibration to the determined controller and sends (inputs) the vibration data for the vibration to be presented. When receiving the vibration data from the application program, the operating system transmits, in addition to the vibration data, the controller ID of the controller that the vibration is to be generated.

In addition, since eight (8) controllers are connectable to the main body apparatus 10a at the maximum, in FIG. 14, the third controller 120 is further connectable.

Moreover, as described above, other controllers that a shape or/and weight differ from those of the third controller 120 may be connected.

Figure 15:
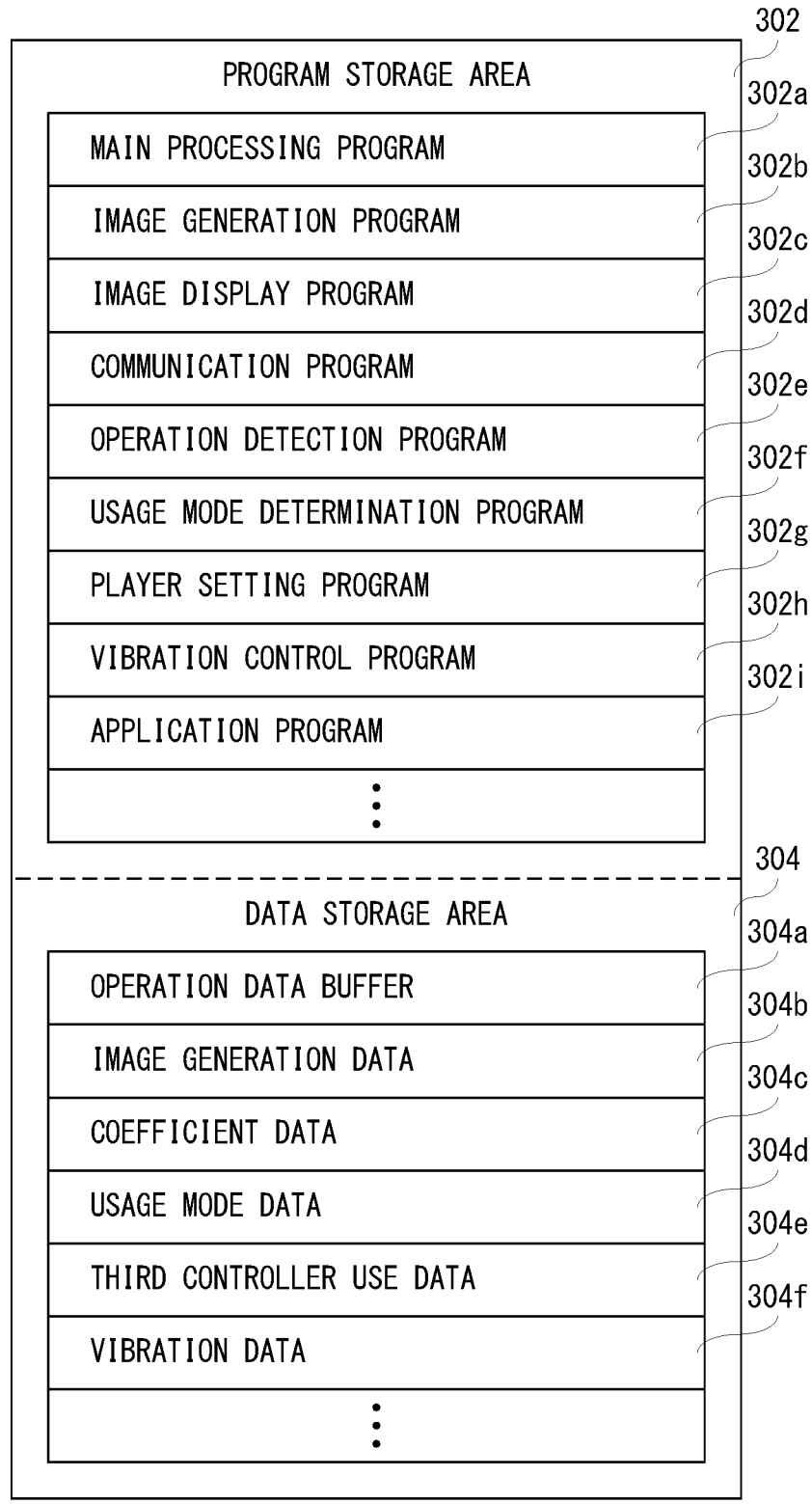
FIG. 15 is an illustration view showing a non-limiting example memory map of a RAM of the game apparatus shown in FIG. 3.

FIG. 15 is an illustration view showing a non-limiting example memory map 300 of the RAM 22 shown in FIG. 3. As shown in FIG. 15, the RAM 22 includes a program storage area 302 and a data storage area 304. Various programs are stored in the program storage area 302. Various programs may be partly or entirely read from the flash memory 24 at a proper timing after a power supply of the game apparatus 10 is turned on, and stored in the RAM 22.

In addition, in replace with the flash memory 24, various programs may be acquired from a memory attachable/detachable to or from the game apparatus 10 or an optical disk, and when the game apparatus 10 is provided with a function of communication with other information processing apparatus (computers), various programs may be acquired (downloaded) directly or via a network from the other information processing apparatus.

As shown in FIG. 15, the program storage area 302 is stored with a main processing program 302a, an image generation program 302b, an image display program 302c, a communication program 302d, an operation detection program 302e, a usage mode determination program 302f, a player setting program 302g, a vibration control program 302h, an application program 302i, etc.

The main processing program 302a is a program (operating system) for processing a main routine of an operation of the game apparatus 10. The image generation program 302b is a program for generating image data corresponding to images to be displayed on the display 12 with using image generation data 304b including polygon data, texture data, etc. The image display program 302c is a program for outputting the image data generated according to the image generation program 302b to the display 12.

The communication program 302d is a program for performing transmission and reception of the data (communication) with controllers such as the first controller 14, the second controller 16 and the third controller 120. The operation detection program 302e is a program for detecting operation data from the controllers such as the first controller 14, the second controller 16 and the third controller 120 and for storing the operation data in an operation data buffer 304a. However, information capable of individually identifying the controller is added to the operation data transmitted from each of the controllers.

The usage mode determination program 302f is a program for determining the usage mode of the game apparatus 10. However, the usage mode determination program 302f determines also whether the third controller 120 is to be used. That is, the usage mode determination program 302f, determines the usage mode (connection manner) of the first controller 14, the second controller 16, and the further controller (the third controller 120) different from these controllers.

The player setting program 302g is a program for setting a type of controller (14, 16, 110, 120) to be used for each player when a plurality of players play (operate) the application.

The vibration control program 302h is a program for controlling the drive of the vibration motors 82b, 102b, 162b and 164b (14c, 16c, 120c) provided in the controllers (14, 16, 120) communicably connected to the main body apparatus 10a in response to a request from the application program 302i.

The application program 302i is a program about applications such as a game, as described above. However, in this embodiment, it may be requested (demanded) by the operating system to present the vibration and the vibration data may be input to the operating system during execution of the application program 302i. Moreover, in this specification, the application program 302i means programs not included in the main body functions.

In addition, although illustration is omitted, the program storage area 302 is also stored with a program for a further main body function performing transmission/reception of messages. Moreover, other application programs different from the application program 302i may be stored in the program storage area 302.

In the data storage area 304, the operation data buffer 304a, the image generation data 304b, coefficient data 304c, usage mode data 304d, third controller use data 304e, vibration data 304f, etc. are stored.

The operation data buffer 304a is stored with the operation data detected by the operation data detection program 302e according to time series. The image generation data 304b is data for generating image data corresponding to images (screens) to be displayed on the display 12, such as polygon data, texture data, etc.

The coefficient data 304c is data about coefficients for controlling the applied voltage E of the vibration motors 82b, 102b, 162b and 164b for each frequency band, and is set in advance according to the usage mode of the game apparatus 10.

Figures 16, 19:
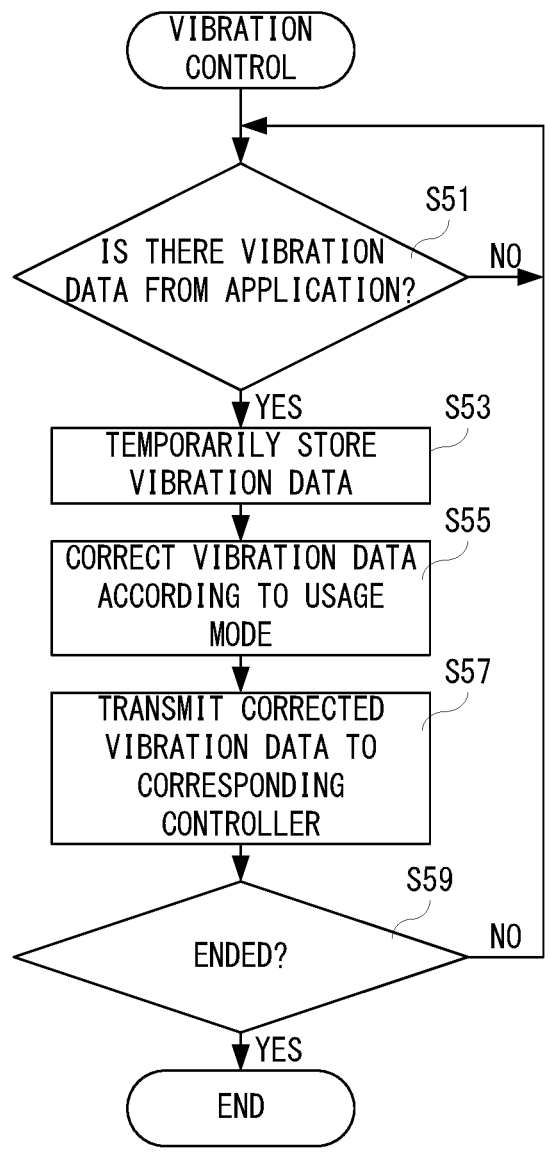
FIG. 16 is an illustration view showing contents of coefficient data according to the usage mode etc.
FIG. 19 is a flow chart showing non-limiting example vibration control processing of a CPU shown in FIG. 3.

FIG. 16 is an illustration view showing a non-limiting example coefficient data 304c. As shown in FIG. 16, according to the usage mode of the game apparatus 10, a plurality of sets of coefficients αi (alpha i), βi (beta i) (i=1, 2, - - -, n) corresponding to frequencies fa, fb, - - -, fn are stored. In this embodiment, each of the frequencies fa, fb, - - -, fn is a representative value for each predetermined band width (10 Hz, for example) in the entire frequency band (from 80 Hz to 600 Hz) that the vibration is to be presented. The coefficient data 304c is set with the coefficient αi for each of the frequencies fa, fb, fn corresponding to the first to third modes, and the coefficient βi for each of the frequencies fa, fb, - - -, fn corresponding to the fourth mode (the third controller 120 is used). However, the coefficient αi and the coefficient βi are set based on test or experiment, etc. wherein the first controller 14, the second controller 16 and the third controller 120 are used in the first-fourth modes. However, the coefficient αi and the coefficient βi may be calculated using mathematical formula.

In addition, although the same coefficient data is used in the first to third modes in this embodiment as described above, since the characteristic of the whole apparatus to be vibrated differ for each usage mode, different coefficient data may be used in the first to third modes.

Moreover, although the coefficient Di about a case where the third controller 120 is used in the fourth mode in this embodiment, when using a further controller different from the third controller 120, a coefficient according to the further controller may be set.

Returning to FIG. 15, the usage mode data 304*d* is a data about the usage mode of the game apparatus 10 determined according to the usage mode determination program 302*f*. For example, the usage mode data 304*d* consists of a 2-bit register, and "00" is set to the register when the first mode is determined, "01" is set to the register when the second mode is determined, "10" is set to the register when the third mode is determined, and "11" is set to the register when the fourth mode is determined.

The third controller use data 304*e* is a data for determining whether the third controller 120 is to be used. The vibration data 304*f* is vibration data that is input from the application program 302*i*, and may be corrected according to the usage mode. In correcting the vibration data 304*f*, the coefficient data 304*c* is referred to. Correcting the vibration data is equivalent to controlling the corresponding waveform of the vibration signal (vibration waveform) for each frequency band.

Although illustration is omitted, the data storage area 304 is stored with other data necessary for controlling the operation of the game apparatus 10, and provided with a counter(s) (timer(s)) necessary for controlling the operation of the game apparatus 10.

Figure 17:
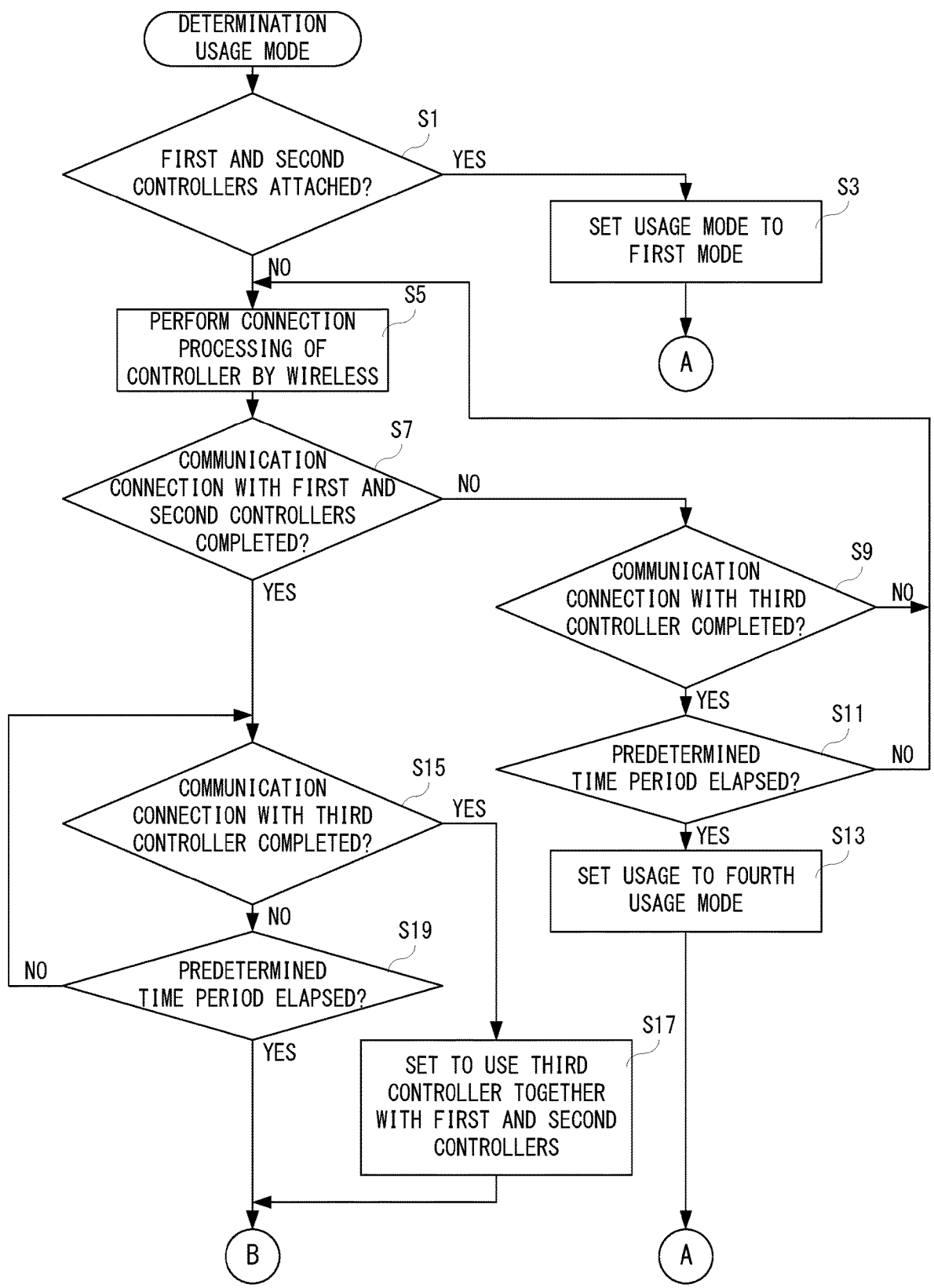
FIG. 17 is a flow chart showing a part of non-limiting example usage mode determination processing of a CPU shown in FIG. 3.
Figure 18:
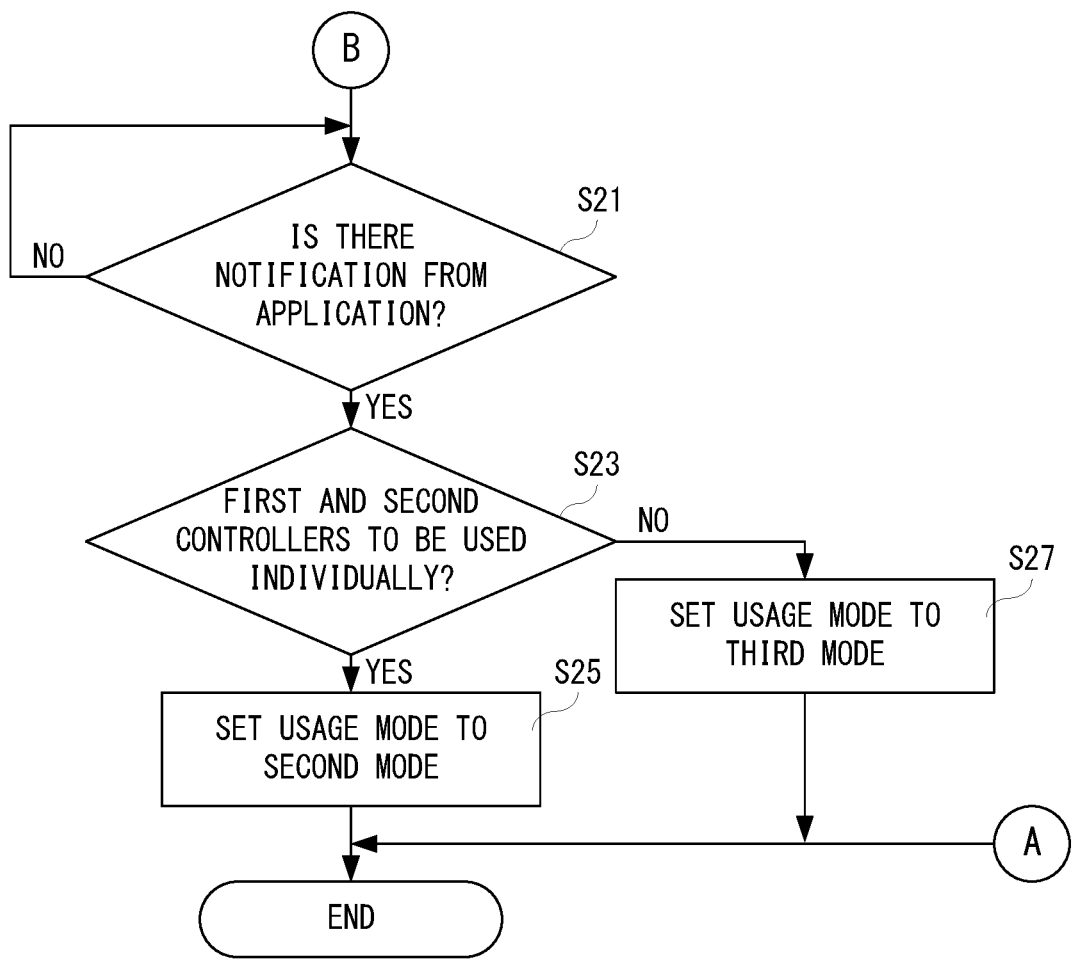
FIG. 18 is a flow chart showing another part of the non-limiting example usage mode determination processing of the CPU shown in FIG. 3, following FIG. 17.

FIG. 17 and FIG. 18 are flow charts showing non-limiting example usage mode determination processing of the CPU 20 shown in FIG. 3. For example, the CPU 20 starts the usage mode determination processing in response to a predetermined timing that an application including processing for presenting vibration is started, that a predetermined event occurs in the application concerned, etc.

As shown in FIG. 17, when the usage mode determination processing is started, the CPU 20 determines, in a step S1, whether the first controller 14 and the second controller 16 are attached to the main body apparatus 10*a*. For example, the CPU 20 outputs from each of the left terminal 28 and the right terminal 30 a signal for checking whether the controllers are attached, and determines whether there is any response from each of the first controller 14 and the second controller 16.

If "YES" is determined in the step S1, that is, if the main body apparatus 10*a* is attached with the first controller 14 and the second controller 16, the usage mode of the game apparatus 10 is set in the first mode in a step S3, and as shown in FIG. 18, the usage mode determination processing is terminated. In the step S3, the CPU 20 makes the data storage area 304 of the RAM 22 store the usage mode data 304*d* that a value of the register is "00."

On the other hand, if "NO" is determined in the step S1, that is, if the main body apparatus 10*a* is not attached with the first controller 14 and the second controller 16, connection registration processing (pairing) for the controller is performed by wireless communication in a step S5.

Subsequently, it is determined, in a step S7, whether communication connection with the first controller 14 and the second controller 16 is completed. If "NO" is determined in the step S7, that is, if the communication connection with the first controller 14 and the second controller 16 is not completed, it is determined, in a step S9, whether communication connection with the third controller 120 is completed.

If "NO" is determined in the step S9, that is, if the communication connection with the third controller 120 is not completed, the process returns to the step S5. On the other hand, if "YES" is determined in the step S9, that is, if the communication connection with the third controller 120 is completed, it is determined, in a step S11, whether a predetermined time period (for example, 5 to 10 seconds) elapses after starting the connection registration processing in the step S5. This is true in a step S19 described later.

If "NO" is determined in the step S11, that is, if the predetermined time period does not elapse, the process returns to the step S5. If "YES" is determined in the step S11, that is, if the predetermined time period elapses, it is set to use the third controller 120 in the fourth usage mode in a step S13, and then, the usage mode determination processing is terminated. Specifically, in the step S13, the CPU 20 makes the data storage area 304 of the RAM 22 store the usage mode data 304*d* that a value of the register is "11" and the third controller use data 304*e* indicating that the third controller 120 is to be used.

Moreover, if "YES" is determined in the step S7, that is, if the communication connection with the first controller 14 and the second controller 16 is completed, it is determined, in a step S15, whether the communication connection with the third controller 120 is completed. If "YES" is determined in the step S15, it is set to use the third controller 120 in addition to the first controller 14 and the second controller 16 in a step S17, and the process proceeds to a step S21 shown in FIG. 18. Specifically, in the step S17, the CPU 20 makes the data storage area 304 of the RAM 22 the third controller use data 304*e* indicating that the third controller 120 is to be used.

On the other hand, if "NO" is determined in the step S15, it is determined, in a step S19, whether the predetermined time period elapses after starting the connection registration processing in the step S5. If "NO" is determined in the step S15, the process returns to the step S15. On the other hand, if "YES" is determined in the step S15, the process proceeds to the step S21.

In FIG. 18, it is determined, in the step S21, whether there is any notification from the application program 302*i*. For example, from the application program 302*i*, information for identifying whether the first controller 14 and the second controller 16 are individually used, that is, the game apparatus 10 is used in the second mode, or the first controller 14 and the second controller 16 are integrally used, that is, the game apparatus 10 is used in the third mode is notified.

If "NO" in the step S21, that is, if there is no notification from the application program 302*i*, the process returns to the same step S21. On the other hand, if "YES" is determined in the step S21, that is, if there is notification from the application program 302*i*, it is determined, in a step S23, whether the first controller 14 and the second controller 16 individually.

If "YES" is determined in the step S23, that is, if the first controller 14 and the second controller 16 are to be used individually, the usage mode of the game apparatus 10 is set in the second mode in a step S25, and then, the usage mode determination processing is terminated. In the step S25, the CPU 20 makes the data storage area 304 of the RAM 22 store the usage mode data 304*d* that the register value is "01."

On the other hand, if "NO" is determined in the step S23, that is, if the first controller 14 and the second controller 16 are to be integrally used (the controller 110 is to be used), the usage mode determination processing is terminated after the usage mode of the game apparatus 10 is set in the third mode in a step S27. In the step S27, the CPU 20 makes the data storage area 304 of the RAM 22 store the usage mode data 304d that register value is "10."

FIG. 19 is a flow chart showing a non-limiting example vibration control processing of the CPU 20 shown in FIG. 3. For example, if requested (commanded) from the application program 302i to generate the vibration, the CPU 20 starts the vibration control processing. However, if a plurality of controllers are to be used, the vibration control processing is performed in parallel for respective controllers. Moreover, when sending the same vibration data to the first controller 14 and the second controller 16, it is sufficient to transmit the vibration data that is corrected by one time the vibration control processing to both controllers (14, 16), without performing the vibration control processing individually.

As shown in FIG. 19, when starting the vibration control processing the CPU 20 determines, in a step S51, whether vibration data is input from the application program 302i. If "NO" is determined in the step S51, that is, if the vibration data is not input from the application program 302i, the process returns to the step S51. On the other hand, if "YES" is determined in the step S51, that is, if the vibration data is input from the application program 302i, the vibration data is temporarily stored in a step S53. That is, the vibration data 304f is stored in the data storage area 304 of the RAM 22.

In a next step S55, the vibration data is corrected according to the usage mode. Here, the CPU 20 acquires the usage mode with reference to the usage mode data 304d, and corrects (updates) the vibration data 304f generated in the step S53 with using the coefficient data corresponding to the acquired usage mode with reference to the coefficient data 304c. That is, the amplitude of the vibration waveform is controlled.

Subsequently, in a step S57, the corrected vibration data 304f is transmitted to the corresponding controller (14, 16, 120). Therefore, in the controller (14, 16, 120) that receives the vibration data 304f, the vibration motor (82b, 102b, 162b, 164b) is driven based on the vibration data 304f. Therefore, the vibration motor (82b, 102b, 162b, 164b) outputs (vibrates) with a pattern according to the vibration signal.

It is determined, in a step S59, whether it is to be ended. Here, the CPU 20 determines whether the application containing the processing that presents the vibration is ended, or whether a scene that presents the vibration in the application concerned is ended.

If "NO" is determined in the step S59, that is, if not to be ended, the process returns to the step S51. On the other hand, if "YES" is determined in the step S59, that is, if to be ended, the vibration control processing is terminated.

According to this embodiment, since the vibration waveform is controlled at an end of the operating system according to the characteristic of the controller to be used, even if a different controller is used, it is possible to cause the player to perceive the same or similar vibration without making the creator or developer of an application consider vibration expression corresponding to the characteristic of the device.

Moreover, according to this embodiment, it is possible to reduce labor involved in developing an application since it is not necessary to make the creator or developer of the application consider vibration expression corresponding to the characteristic of the device.

Furthermore, according to this embodiment, since the amplitude of the vibration signal (control signal) is decreased in the frequency band including the resonance frequency and neighbouring frequencies, it is possible to present the vibration having the intensity of the same degree in all frequency bands that the vibration is to be presented. Moreover, it is possible to prevent or suppress the chatter sound from occurring from the housing of the controller.

In addition, although the amplitude included in the vibration data is multiplied with the coefficient according to the usage mode of the game apparatus 10 in this embodiment, it does not need to be limited to this. For example, the frequency included in the vibration data may be multiplied by the coefficient, or both the amplitude and frequency included in the vibration data may be multiplied by the coefficient.

Moreover, in this embodiment, when using the game apparatus 10 in the second mode or the third mode, the usage mode is notified to the operating system from the application program 302i, but it does not need to be limited to this. For example, by providing a detection portion capable of electrically detecting that the first controller 14 and the second controller 16 are attached to the connection member 18, respectively, and a detection result of the detection portion may be notified to the main body apparatus 10a from each of the first controller 14 and the second controller 16. In this way, one of the first mode to the fourth mode can be determined by the operating system without receiving the notification from the application program 302i.

Furthermore, in this embodiment, when using the game apparatus 10 in the second mode, two players can play the game in a manner that the first controller 14 is used by one player and the second controller 16 is used by another player. Moreover, when using the game apparatus 10 in the second mode, one player can use the first controller 14 or the second controller 16 to play the game.

Furthermore, although the vibration data that is input from application is data about a set of the value indicating the frequency and the voltage value indicating the amplitude in this embodiment, the vibration signal (vibration waveform) itself may be the vibration data as described above. In such a case, the CPU 20 incorporated in main body apparatus can generate the vibration data from the vibration signal. For example, the vibration signal is divided into segments each having a predetermined time width (for example, 5 msec-few or several 10 msec), and each of the segments is subjected to frequency decomposition, and then, major components are extracted out of sets of a frequency f and an amplitude A included in a result of the frequency decomposition, for example, and the extracted component is decided as a representative value in each of the segments. As a result, a set of data composed of combinations each consists of a value indicating the frequency f and a voltage value indicating the amplitude A is obtained as vibration data corresponding to the vibration signal. However, a set of data of combinations each consists of a frequency f and an amplitude A may be used as the vibration data.

Moreover, although the applied voltage E is decreased by multiplying the applied voltage E by the coefficient at the resonance frequency and neighbouring frequencies in this embodiment, as described above, when the vibration signal is input, by applying a filter (a band stop filter or a band elimination filter) for frequencies neighbouring the resonance frequency, by reducing a level of the amplitude corresponding to the resonance frequency and neighbouring frequencies in the vibration signal, the applied voltage E can be decreased.

Furthermore, although the vibration data is corrected by multiplying by the coefficient in the main body apparatus in this embodiment, the vibration data may be corrected in an end of the controller by multiplying the coefficient.

In addition, a specific appearance of the apparatus or device and the specific numerical values are mere exemplification, and can be changed suitably according to actual products. For example, processing of respective steps of flowchart of FIG. 17-FIG. 19 are mere example, and if the same or similar effect (result) is obtained, an order of the steps may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A vibration control system, comprising:
at least one processor configured to at least:
generate vibration data; and
make at least a first device vibrate based on the generated vibration data, the vibration data being adjustable to make the first device vibrate according to one of a plurality of different usage modes being used, the plurality of different usage modes including a first usage mode specifying a first physical coupling relationship in which multiple devices are physically coupled together to form the first device, and a second usage mode specifying a second physical coupling relationship in which the first device is not physically coupled to another device.

2. The vibration control system according to claim 1, wherein the generated vibration data includes data values respectively indicating a frequency and an amplitude of a vibration waveform on which the vibration data is based.

3. The vibration control system according to claim 2, wherein the amplitude of the vibration waveform is controlled for each frequency band.

4. The vibration control system according to claim 3, wherein the vibration data includes a set of data values of the frequency and the amplitude of the vibration waveform, and the vibration waveform is controlled by multiplying, for each frequency band, the amplitude of each set by a coefficient.

5. The vibration control system according to claim 1, wherein the at least one processor is configured to make the first device and a second device vibrate simultaneously.

6. The vibration control system according to claim 1, wherein the at least one processor is included in a main body apparatus that is separate from the first device and a second device.

7. The vibration control system according to claim 6, wherein the main body apparatus is physically connected to at least one of the first device and the second device, and
the vibration data provided to the first and/or second device is controlled based on type information acquired from the one(s) of the first and second devices that is/are connected to the main body apparatus.

8. The vibration control system according to claim 6, wherein the at least one processor included in the main body apparatus is configured to:
execute an application program, and
control the vibration data provided to the first device and/or the second device in accordance with a connection manner notification from the application program that specifies the manner in which the first device and/or the second device is/are connected to the main body apparatus.

9. The vibration control system according to claim 1, wherein the first coupling relationship includes first and second handheld controllers being directly attached to a main control apparatus.

10. The vibration control system according to claim 1, wherein the plurality of different usage modes includes a third usage mode specifying a third coupling relationship in which multiple devices are physically coupled together to form the first device in a manner different than in the first coupling relationship.

11. The vibration control system according to claim 10, wherein:
the first coupling relationship includes first and second handheld controllers being directly attached to a main control apparatus;
the third coupling relationship includes first and second handheld controllers being directly attached to a common article different from the main control apparatus; and
wherein the first device in the first and third usage modes includes first and second handheld controllers functioning as a single controller.

12. The vibration control system according to claim 1, wherein the second usage mode corresponds to the first device being physically decoupled from a main control apparatus and being usable by left and/or right hand of a single user.

13. A vibration control apparatus, comprising:
at least one processor configured to at least:
generate vibration data; and
make one or more devices vibrate based on the generated vibration data, the vibration data being adjustable to make each of the one or more devices vibrate according to one of a plurality of different usage modes being used by the respective device, the plurality of different usage modes including a first usage mode specifying a first physical coupling relationship in which multiple devices are physically coupled together to form the respective device, and a second usage mode specifying a second physical coupling relationship in which the respective device is not physically coupled to another device.

14. The vibration control apparatus according to claim 13, wherein:
the plurality of different usage modes includes a third usage mode specifying a third coupling relationship in which multiple devices are physically coupled together to form a first device in a manner different than in the first coupling relationship;
the first coupling relationship includes first and second handheld controllers being directly attached to a main control apparatus; and
the third coupling relationship includes first and second handheld controllers being directly attached to a common article different from the main control apparatus.

15. The vibration control apparatus according to claim 14, wherein the first device in the first and third usage modes includes first and second handheld controllers functioning as a single controller.

16. The vibration control apparatus according to claim 14, wherein the second usage mode corresponds to the first device being physically decoupled from the main control apparatus and being usable by left and/or right hand of a single user.

17. A non-transitory computer readable storage medium storing a vibration control program that is executable by a computer, the vibration control program, when executed, causing the computer to at least:
    generate vibration data; and
    make at least a first device vibrate based on the generated vibration data, the vibration data being adjustable to make the first device vibrate according to one of a plurality of different usage modes being used, the plurality of different usage modes including a first usage mode specifying a first physical coupling relationship in which multiple devices are physically coupled together to form the first device, and a second usage mode specifying a second physical coupling relationship in which the first device is not physically coupled to another device.

18. A vibration control method, the method comprising:
    generating vibration data; and
    making at least a first device vibrate based on the generated vibration data, the vibration data being adjustable to make the first device vibrate according to one of a plurality of different usage modes being used, the plurality of different usage modes including a first usage mode specifying a first physical coupling relationship in which multiple devices are physically coupled together to form the first device, and a second usage mode specifying a second physical coupling relationship in which the first device is not physically coupled to another device.

19. The method according to claim 18, the plurality of different usage modes includes a third usage mode specifying a third coupling relationship in which multiple devices are physically coupled together to form the first device in a manner different than in the first coupling relationship;
    the first coupling relationship includes first and second handheld controllers being directly attached to a main control apparatus; and
    the third coupling relationship includes first and second handheld controllers being directly attached to a common article different from the main control apparatus.

20. The method according to claim 19, wherein:
    the second usage mode corresponds to the first device being physically decoupled from the main control apparatus and being usable by left and/or right hand of a single user; and
    the first device in the first and third usage modes includes first and second handheld controllers functioning as a single controller.

* * * * *